(12) United States Patent
Wild et al.

(10) Patent No.: US 7,441,193 B1
(45) Date of Patent: Oct. 21, 2008

(54) ADAPTABLE AND WIDELY APPLICABLE CONTROL SURFACE

(75) Inventors: Andrew James Wild, Van Nuys, CA (US); Robert Charles Boyer, Cupertino, CA (US); Martin Kloiber, Portola Valley, CA (US); Steven H Milne, Palo Alto, CA (US)

(73) Assignee: Euphonix, Inc., Palo Alto, CA (US)

(*) Notice: Subject to any disclaimer, the term of this patent is extended or adjusted under 35 U.S.C. 154(b) by 502 days.

(21) Appl. No.: 10/961,733

(22) Filed: Oct. 7, 2004

Related U.S. Application Data

(60) Provisional application No. 60/509,703, filed on Oct. 7, 2003.

(51) Int. Cl.
*G06F 13/00* (2006.01)
*G06F 15/00* (2006.01)
(52) U.S. Cl. .......................... 715/733; 345/173
(58) Field of Classification Search ......... 715/733–735, 715/840–863, 763–765; 345/173, 179
See application file for complete search history.

(56) References Cited

U.S. PATENT DOCUMENTS

| | | | | |
|---|---|---|---|---|
| 5,063,600 A | * | 11/1991 | Norwood | 382/186 |
| 5,379,057 A | * | 1/1995 | Clough et al. | 345/173 |
| 2002/0141643 A1 | * | 10/2002 | Jaeger | 382/181 |

OTHER PUBLICATIONS

U.S. Appl. No. 60/509,703.

* cited by examiner

*Primary Examiner*—Cao Nguyen
(74) *Attorney, Agent, or Firm*—Central Coast Patent Agency, Inc.

(57) ABSTRACT

A control surface has one or more soft devices for which functionality may be assigned, a central processing unit (CPU), including operating code, for managing at least functionality of the soft devices on the control surface, and a network connection for connecting to one or more computerized appliances. The control code assigns individual ones of the one or more soft devices to specific functions of an individual one of the one or more computerized appliances. There may be a variety of different kinds of soft devices, and the functionality for the soft devices of the control surface may be determined by which application is frontmost on one of the computerized appliances.

20 Claims, 18 Drawing Sheets

| Section | Locked to |
|---|---|
| Soft Knobs | ▶ |
| Soft Keys | Not Locked |
| Faders | Nuendo Application Set |
| Left Edit Upper | Logic Application Set |
| Right Edit Upper | Giga Sampler Application Set ▶ |
| Left Edit Lower | Nuendo Application Set ▶ |
| Right Edit Lower | Not Locked ▶ |
|  | Not Locked |

Fig. 14

ADAPTABLE AND WIDELY APPLICABLE CONTROL SURFACE

CROSS-REFERENCE TO RELATED DOCUMENTS

The present application claims priority to Provisional Application U.S. 60/509,703, filed on Oct. 7, 2003, and incorporates all disclosure of the priority document at least by reference.

FIELD OF THE INVENTION

The present invention is in the area of user-interface control surfaces, and more particularly relates to control panels that may be adapted to control a wide variety of apparatus and appliances.

BACKGROUND OF THE INVENTION

It is well-known that there exist in the electro-mechanical and related electronic arts a wide variety of control interfaces, sometimes termed surfaces, control panels, and the like, which employ a wide variety of elements such as electronic displays, touchscreens, trackballs and other pointer devices, knobs, smart switches, sliders, monitoring elements, keyboards and the like. It is also well-known in the art that such control surfaces are typically closely allied with a particular apparatus.

As an example of a control surface, a keyboard and a mouse, or other pointing device, along with a video display, comprise a typical control unit for a personal computer. It does not matter that the display, keyboard and pointer may be discrete devices, they may be considered as a whole an I/O interface for a computer, and indeed may be implemented in a single control surface or panel.

As another example, virtually every electronic appliance, such as a DVD player as an isolated example, will have a front panel with rotary inputs (knobs), pushbutton switches, one or more LCD displays, and the like, for a user to initiate and track functions of the player.

Although there are very simple devices commercially available, such as switch panels with preassembled switches in an electrical box, which may be adapted turn motors on and off, for example, it is not known in the art to adapt a generic control surface to a really broad variety of appliances, applications and equipment, such as, for example, Digital Audio Workstation software, other sorts of software, editing software and/or hardware, audio equipment, machinery and vehicles.

What is clearly needed, therefore, is a largely generic control surface that may be adapted to a broad variety of both hardware and software, and may do so in unique ways, providing efficient and cost-effective solutions for both suppliers and users. The inventions taught in enabling detail below in several embodiments provide just such adaptable control surfaces.

SUMMARY OF THE INVENTION

In one embodiment of the present invention a control surface is provided, comprising one or more soft devices for which functionality may be assigned, a central processing unit (CPU), including operating code, for managing at least functionality of the soft devices on the control surface, and a network connection for connecting to one or more computerized appliances. The control code assigns individual ones of the one or more soft devices to specific functions of an individual one of the one or more computerized appliances.

In some embodiments the soft devices include one or more of soft knobs, soft switches or faders. Also in some embodiments the specific functions of the individual one of the one or more computerized appliances relate to or are determined by a software program being executed by the individual computerized appliance. In one embodiment that determination is made according to an application being frontmost on one of the controlled computerized devices.

In some embodiments the computerized appliances include personal computers (PCs), and in some embodiments the network connection is an Ethernet connection. The connection may also be a wireless connection.

In some embodiments the control surface further comprises an interactive display, wherein the control surface operating code includes code for generating an interactive interface on the display, enabling a user to define functionality for individual ones of the soft knobs, soft switches and faders. Also in some embodiments the operating code includes functionality for storing sets of functionality for sets of soft knobs, soft switches or faders on the control surface. In other embodiments individual sets of functionality include functionality for all of the soft knobs, soft switches and faders on the control surface.

In another aspect of the invention a method for controlling one or more computerized appliances is provided, comprising steps for (a) implementing a control surface having one or more soft devices for which functionality may be assigned; (b) programming a central processing unit (CPU) for managing at least functionality of the soft devices on the control surface; (c) connecting the control surface via a network connection to one or more computerized appliances; and (d) executing the control code to assign individual ones of the one or more soft devices to specific functions of an individual one of the one or more computerized appliances.

In some embodiments the soft devices include one or more of soft knobs, soft switches or faders. Also in some embodiments the specific functions of the individual one of the one or more computerized appliances relate to or are determined by a software program being executed by the individual computerized appliance. IN still other embodiments the individual computerized appliance executes a different software program at different times, and the control surface control code monitors the software program in execution and having keyboard and pointer focus, that is, frontmost, and automatically assigns the control surface functionality according to the frontmost program.

In some cases the computerized appliances include personal computers (PCs), and the network connection may be an Ethernet connection. In other cases the network connection may be a wireless connection. In still other embodiments the control surface further comprises an interactive display, and the control surface operating code includes code for generating an interactive interface on the display, enabling a user to define functionality for individual ones of the soft knobs, soft switches and faders.

In some cases the operating code includes functionality for storing sets of functionality for sets of soft knobs, soft switches or faders on the control surface, and in some cases individual sets of functionality include functionality for all of the soft knobs, soft switches and faders on the control surface.

BRIEF DESCRIPTION OF THE DRAWING FIGURES

FIG. 14 illustrates a touchscreen in an embodiment of the invention.

DESCRIPTION OF THE PREFERRED EMBODIMENTS

Figure 1:
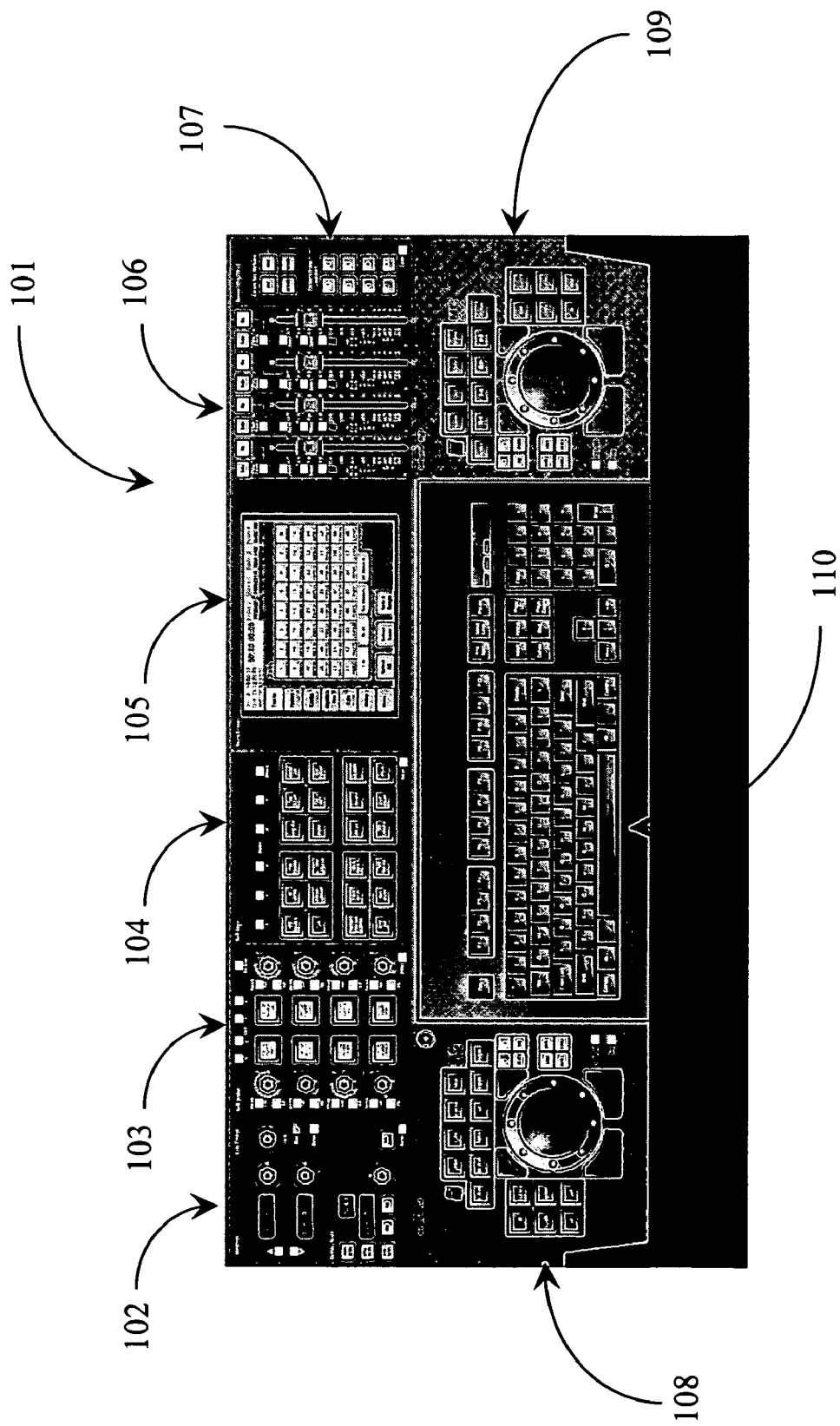
FIG. 1 is a plan view of an adaptable control surface in an embodiment of the present invention.

FIG. 1 is a plan view of an adaptable control surface 101 in an embodiment of the present invention. Adaptable control surface 101 can be used to control a Digital Audio Workstation (DAW), such as Steinberg's Nuendo known in the art (see www.steinberg.net), but is flexible enough to control a variety of hardware and software such as other digital audio workstation software, music composition software, video editing software and/or hardware, computer-aided design software, video games, office productivity software, any computer-based application, audio equipment, video equipment, consumer electronic devices, machinery, such as excavators, and vehicles. Throughout this document, the Nuendo is used as a controlled system, but the skilled artisan will understand that the control surface of the invention may be used to monitor and control any of the hardware, software described above, or mixtures of such systems.

Control surface 101 in FIG. 1 comprises a number of control clusters for various purposes, such as a monitoring section 102, an array of soft knobs 103, an array of soft keys 104, a touch screen 105, a fader section 106 with four slide faders, a PC select section 107, a left edit controller 108 including a trackball and other input elements, a right edit controller 109 including a trackball and other input elements, and a full-function keyboard 110.

Figure 2:
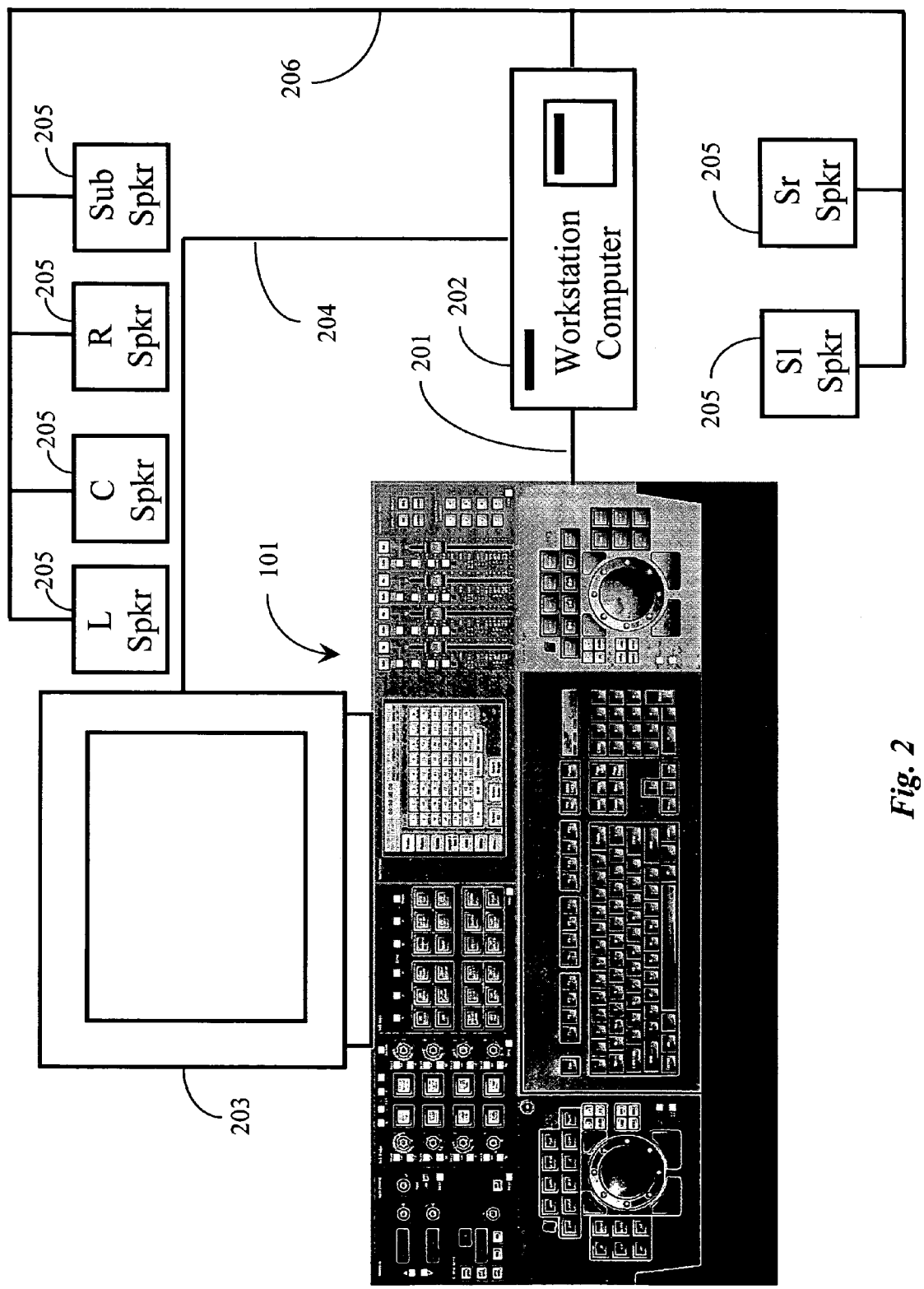
FIG. 2 is a system diagram showing the control surface of Fig. A connected to other system components in an embodiment of the invention.

FIG. 2 is a system diagram showing the control surface of Fig. A connected to other system components in an embodiment of the invention. In this example control surface 101 is connected by an Ethernet connection 201 to a workstation computer 202. A video display unit 203, which may be any of the known displays, such as CRT, flat-panel LCD, and so on, is connected to computer 202 by a video graphics array (VGA) cable 204. Display unit 203 is placed in proximity to control surface 101, as might be done in the case of a keyboard for a personal computer. The workstation computer has audio output lines 206 for controlled audio signals to an array of speakers, of which six speakers 205 are shown. The skilled artisan will understand that there may be more or fewer speakers, and the speakers may be of any of several types and sizes.

The workstation computer is a general-purpose computer in this example that can execute a wide variety of computer programs (applications) that are compatible with the operating system of the workstation. The word "application" generally in this specification used as a noun, means software executing on the computer workstation. Control surface 101 through the various inputs, displays and outputs, can control such applications. Keystrokes, mouse commands, and application commands are sent via the Ethernet connection to the workstation computer, which runs the application. Audio monitoring is provided by a card connected to a PCI bus in the Workstation Computer in this example, the card being controlled by the control surface 101 through commands sent via the Ethernet connection.

Referring now back to FIG. 1, it may be shown that the layout of the adaptable control surface has a number of advantages. For example the keyboard is positioned such that proper keyboard ergonomics may be maintained. The depth (from the front of the keyboard to the back of the unit) is minimized. This feature allows for the video monitor 203 to be located at an ergonomically correct distance from the user. That is, it's not too far away. Left and right trackballs allow for left handed users to use a left-side pointing device, while right handed users can use a right-side pointing device. All users can use both trackballs (and the surrounding wheels) simultaneously in a two handed operation.

Keyboard, mouse, and MIDI commands can be sent from control surface 101 to virtually any application. Through procedures described in enabling detail below keystroke combinations and MIDI commands can be assigned to soft switches, faders, and knobs on the control surface 101. Then manipulating one of these controls sends the corresponding keystroke or MIDI command the application. Some applications have been written to work specifically with the control surface of this invention. Such programs use the Euphonix EuCon Application Programmer Interface (EuCon API), from Euphonix, Inc. of Palo Alto, Calif. This feature allows a much tighter level of integration between the control surface and the controlled application. Such applications are called Eucon Aware applications by the inventors. All other applications are called Generic applications for the purpose of this specification.

Softkey section 104 comprises a bank of smart switches, implemented as pushbuttons (PBs). Each PB has an LCD display that can show up to 3 lines of text or a 24×36 pixel icon. Because the control surface system can electronically re-label the switches, one switch can be used for multiple functions. Exactly how and when a Smart Switch changes functions will be described in sections throughout this document. In this example a bank is an array of 24 smartswitch PBs. The terms softkey and smartswitch are somewhat synonomous. Any number up to all 24 smartswitches may be programmed for specific functionality in a bank, and there may be any number of defined banks for defined purposes, limited only by the memory space and computing power of the computer elements involved.

In this example setup and configuration is accomplished on the control surface by use of a setup key, one of which is generic to each section, except the fader section 106, which is set up directly from the touchscreen. Pressing the setup key initiates a setup and configuration window on the touchscreen 105.

The control surface in various embodiments of the invention has a rear panel (not shown) with the following elements: A power switch, a DC Power connector (from external PSU), an Ethernet connector, a USB Host, a VGA port (from internal Pentium), a Com1 port from internal Pentium), a Com2 port (from internal Pentium), a ¼" jack for a footswitch, a ¼" stereo headphone jack, and a talkback microphone out male XLR. There is a convenience headphone jack on the front of the unit, located in an ergonomic location. It direct wired to the headphone in jack on the rear panel.

When the control surface is powered on, it reverts to the state it was in when it was last shutdown, which is accomplished through use of non-volatile memory. Powering off the control surface must be done from a File menu described in further detail below in the section describing the touchscreen in detail. This is to allow ordered and safe shutdown.

A keyboard being central to using a computer application, the control surface in embodiments of the invention puts keyboard 110 right in front of the user. The control surface in this embodiment has a standard keyboard, but this is not a limitation. Some embodiments may have specialized keyboards, and a user may substitute a different keyboard. A keyboard tray provided is large enough to accommodate most popular keyboards. The plane of the control surface rakes upward at an angle similar to the typical rake of a keyboard.

Figure 3A:
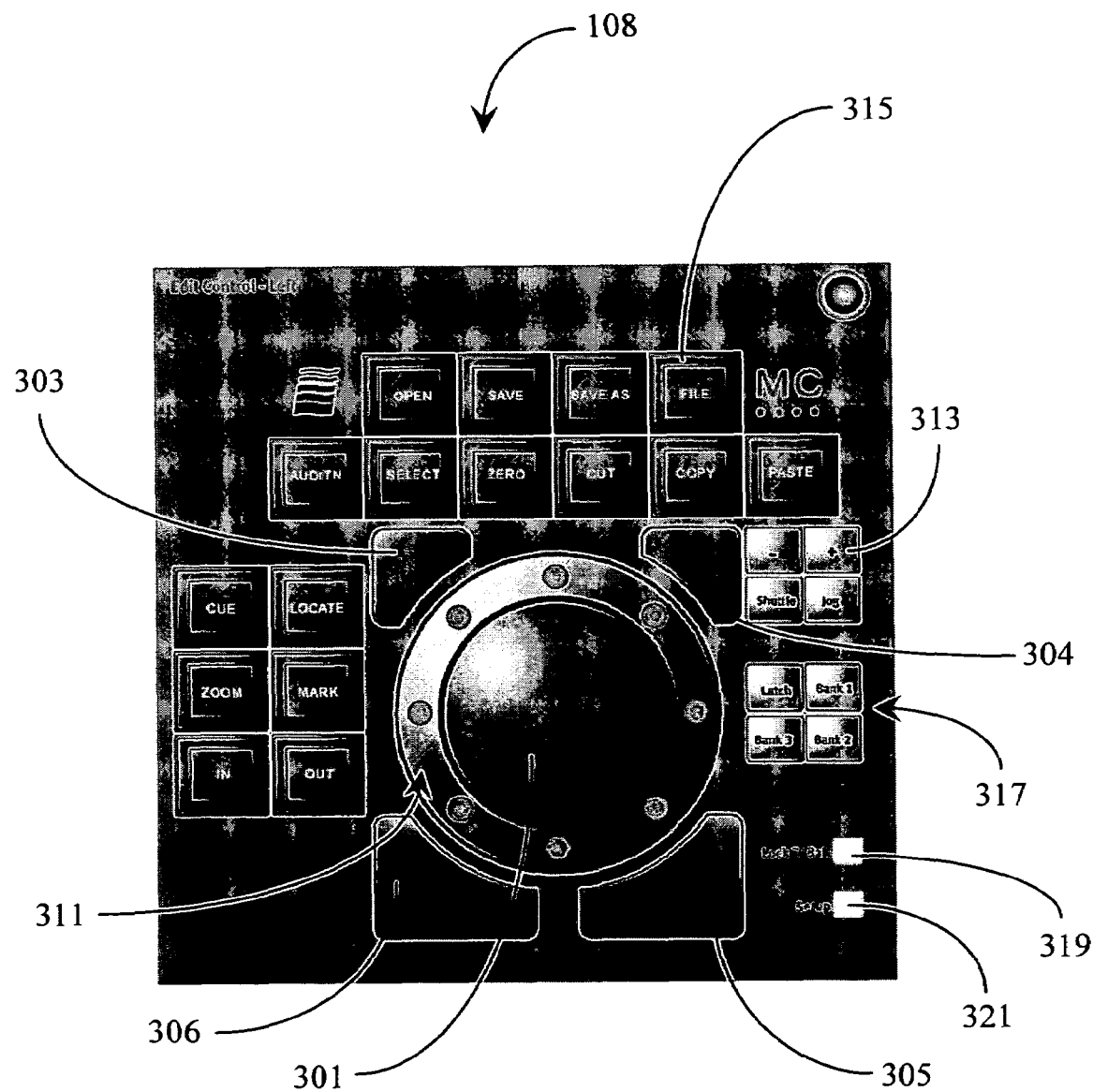
FIG. 3a is a plan view of a left controller section in an embodiment of the present invention.
Figure 3B:
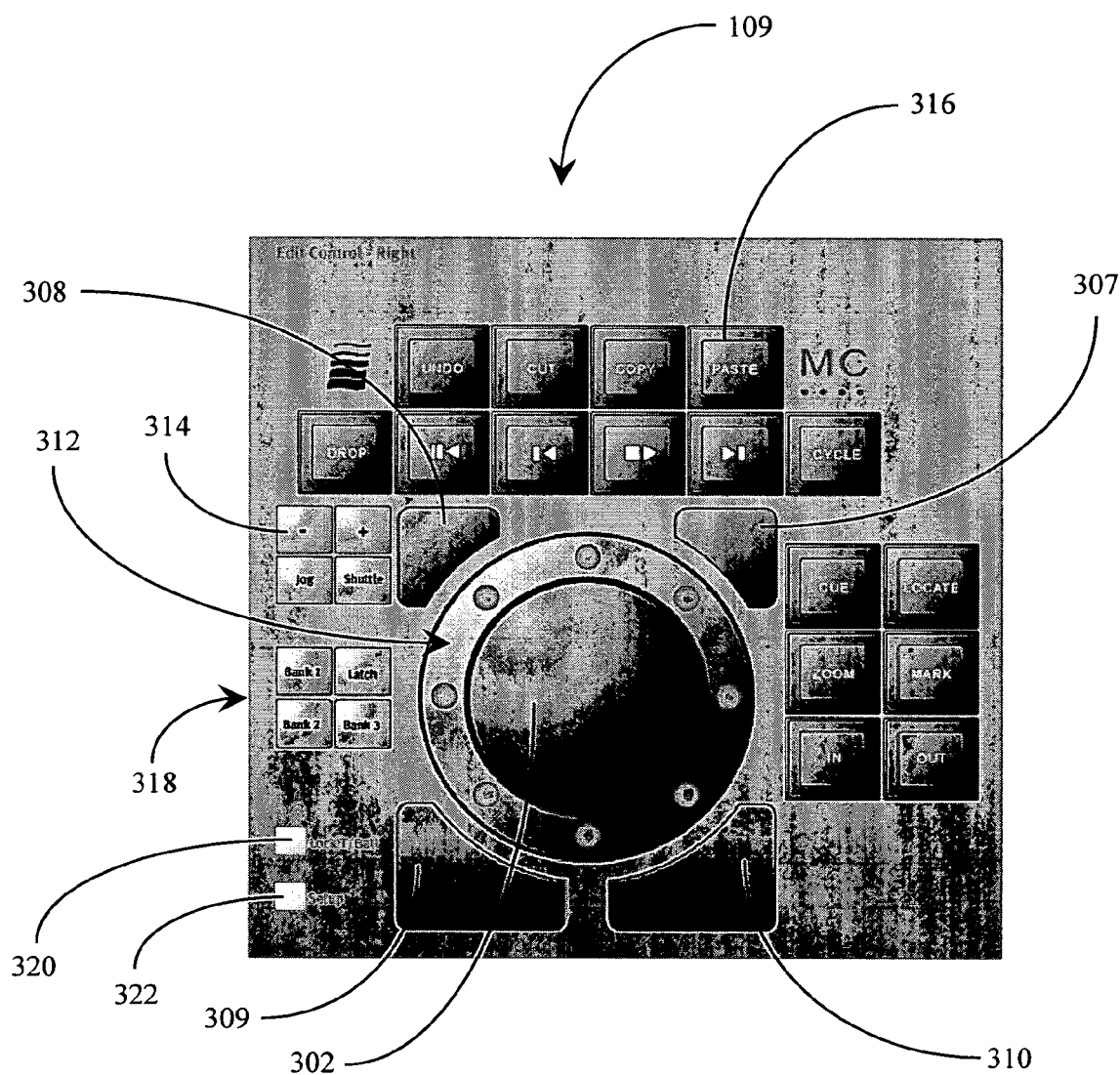
FIG. 3b is a plan view of a right controller section in an embodiment of the present invention.

As described briefly above, the control surface in the instant embodiment has two symmetrical edit controllers 108 (left) and 109 (right). FIG. 3*a* is a plan view of Left controller 108, and FIG. 3*b* is a plan view of Right controller 109.

Each of the edit controllers has a trackball, trackball 301 for controller 108, and trackball 302 for controller 109. Each trackball can act as a pointing device for workstation computer 202 (FIG. 2). The left (301), right (302), or both trackballs can be configured to be the workstation computer X-Y pointing device. Either trackball can also be assigned to control a surround panner, as described in further detail below.

There are four trackball switches surrounding each trackball. Switches 303-306 for controller 108 and switches 307-310 for controller 109. The four trackball switches for each controller may be programmed to perform virtually any function. Typically they are programmed as follows: Lower left—left click (PC), click (Mac), Lower right—right click (PC), click (Mac), Upper left—left click (PC), click (Mac), Upper right—right click (PC), click (Mac).

Each trackball has a surrounding wheel controller, wheel 311 for controller 108 and wheel 312 for controller 109. Each wheel controller may be rotated either clockwise (CW) or counter-clockwise (CCW). CCW rotation decrements a Z value, and rotating CW increments the Z value. This Z value is typically used as the Windows mouse wheel control on the workstation computer. However, it can be assigned to other functions on the workstation computer as well.

Wheels 311 and 312 latch and inter-cancel to give 3 states: (1) Jog—The wheel acts as a jog wheel. (2) Shuttle—The wheel acts as a Shuttle ring. And (3) Jog and Shuttle Off—The wheel acts as a mouse scroll wheel. Either wheel can also control many other functions, such as: trim clip head, trim clip tail, zoom horizontal, zoom vertical, scrub, zoom waveform, move clip position relative to the project timeline, slip the clip without changing its absolute begin or end points relative to the project timeline, trim head (begin position relative to the project timeline) of a clip, trim tail (end position relative to the project timeline) of a clip, adjust fade in time of selected clip, adjust fade out time of selected clip, volume, and pan—the functions operating on a selected track. A more complete list of wheel functions is presented below.

Either trackball can also be used to control the same functions as the wheel. When a trackball is controlling a wheel function, it is constrained to send only X or Y movements.

Smart Switches are used to put the wheel (or trackball) into individual ones of the additional modes described just above. An attribute that can be assigned to a smart switch for such a purpose is either momentary, meaning the user has to hold the switch down, or latching, meaning the user can let go of the switch and must hit it again (or hit another wheel switch) to leave the mode. A user can set a mode when configuring what the switch will do. Leaving a wheel mode puts the wheel (or trackball) back to its default state, which for the wheel is either a mouse wheel, jog, or shuttle, depending upon the state of the Jog and Shuttle buttons, and for the trackball is the system mouse (pointer), surround panner, or unused, depending upon the state of the Lock T/Ball key, whether the trackball was previously controlling the surround panner and system preferences which determine whether the left, right, or both trackballs are the system mouse.

Plus and minus (+/−) keys 313, 314 act as nudge keys for whatever function is assigned to the wheel. Holding the keyboard Shift key while pressing one of the +/−keys allows for greater nudge (ie +/−nudge is usually a frame, shift nudge is 1 sec etc.) The nudge units are determined by the application. For Nuendo, the nudge units are the same as used by the Nudge Pallette in the Nuendo toolbar, which is set by the Grid.

Each edit controller 108,109 has a set of 16 smart switches in this embodiment arranges in an array with a group of ten at the top in two rows and a set of six at the side in two columns. PBs 315 and 316 are indicative of the smart switches. The array of sixteen with each of the edit controllers is called a bank of smart switches. Banks are numbered and also are given each a mnemonic name, and the functionality in each bank is configured and stored to be retrieved and used by pressing one of the three bank keys 317, 318.

An example of functionality for smart switches according to a configured bank is as follows: When pressed, a Smart Switch can send out an application command, a keystroke sequence, a MIDI command, or one of various commands such as change wheel mode, change bank, and so forth. A complete list of what commands Smart Switches can send in one embodiment is provided near the end of this specification.

A smart switch can have either a text label or a 24×36 pixel icon displayed on it. Further smart switches can be configured to repeat, just like a keyboard key, after being held down for a fraction of a second. Banks are configured using the Setup key.

Three banks are available for each of edit controller 108, 109 by selecting the Bank 1, Bank 2 and Bank 3 keys. Bank 1, 2 or 3 keys on the left edit control section of the control surface do not affect the smart switches on the right edit control section, and likewise Bank 1, 2 or 3 keys on the right edit section of the control surface do not affect the smart switches on the right edit control section. The keyboard Ctrl, Alt (Option), Shift and Command keys do not modify these Banks.

The Latch PB is an on-off toggle. When on, the Bank keys have latch functionality. When off the Bank keys have momentary functionality, only while held. Banks 1, 2 and 3 inter-cancel. The current Bank lights to show it is selected. In one embodiment there are 3 default banks for each application write protected. A user can modify these and resave them under new names.

The Lock T-Ball PB 319,320 when selected prevents the trackball from operating. For example a right-handed person would probably want to use the left trackball only as a shuttle wheel. Locking the trackball prevents the cursor moving by mistake when shuttling with the opposite hand.

Setup PB 321,322 causes a Setup Window to pop up on Touch Screen 105 which provides functionality for the create, edit, reorder, name, save, write protect, and delete banks; Choose which command goes on each smart switch; Choose the text label or icon for the smart switch; and Choose commands for the four mouse buttons.

Figure 4:
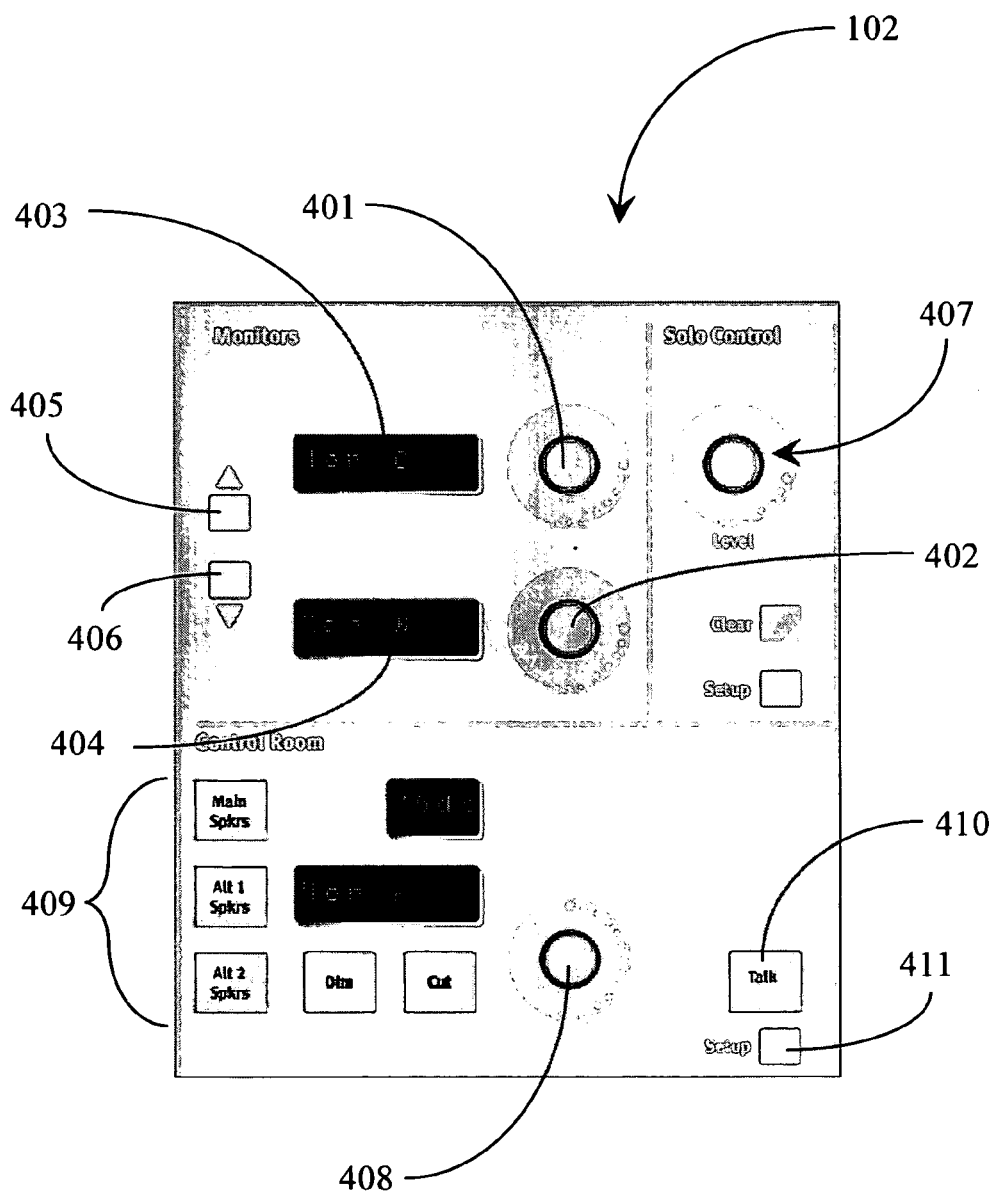
FIG. 4 is a plan view of a monitoring section of the control surface of FIG. 1 in an embodiment of the invention.

Monitoring section 102 on exemplary control surface 101 (FIG. 1) provides control of monitor hardware controlled by workstation computer 202 (FIG. 2). FIG. 4 is a plan view of monitoring section 102. In the instant embodiment a workstation computer has an internal PCI card capable of digital mix bus inputs, digital tape returns, 5.1 Control Room Monitor Out analog, Stereo Control Room Monitor Out Analog, and Stereo Monitor A output for headphone or SLS feed.

There are two knobs 401 and 402 in monitor section 102 for controlling up to four monitor outputs. The source for the monitor output is displayed in an eight-character display 403, 404 adjacent the appropriate knob. Page up and down keys 405 and 406 are used to select between displaying Mon A and B on page 1, (accessed with the page up key), and Mon C and D on page 2 (accessed with the page down key). Any Nuendo Bus, for example, can be a source to a monitor.

Solo control 407 is unused in most applications. Nuendo, for example, has no concept of a Solo Bus.

Knob 408 in the Control Room section controls the overall volume of the Control Room output. Three speaker buttons 409 switch the main Control Room feed between three sets of speakers: Main −5.1 Control Room Monitor Out analog; Alt1—Stereo Control Room Monitor Out Analog; Alt2—A second Stereo Control Room Out Analog.

Talk PB 410 turns on a talkback microphone. The talkback microphone can be routed to various monitor outputs using the Control Room Setup key. Talkback functions can also be assigned to the Smart Switches.

Setup PB 411 in the Control Room portion of the monitor section causes a setup window to pop up on touchscreen 105, which may be used in this embodiment to accomplish the following: (1) Preset Level; (2) Dim Level; (3) Monitor Source; (4) For bus there should be a tape return; (5) Setup for the 4 monitors A, B, C & D; (6) Talkback—Talk button action—talk to Mon A (default), B, C, D, or CR; talkback level; talkback button latch; and (7) Folddown—override the default folddown laws.

Figure 5:
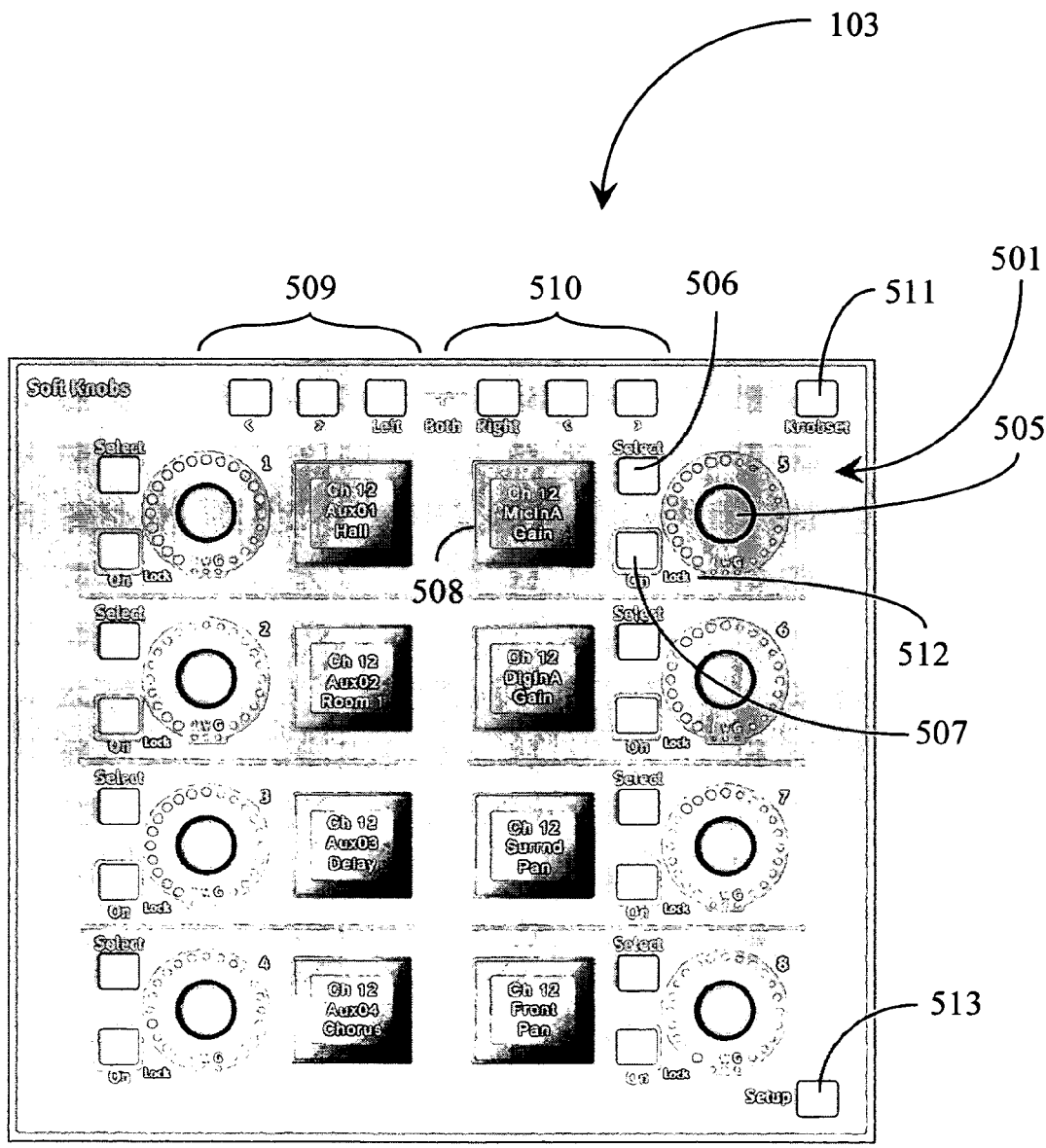
FIG. 5 is a plan view of a Soft Knob section on the control surface of FIG. 1.

FIG. 5 is a plan view of Soft Knob section 103 on control surface 101. There are in this section eight knob cells 501 (one labeled with element number) each with a knob 505, a select key 506, an on key 507, a blue with white text SmartSwitch 508, a lock LED 512, RW LEDs for Select Switch 506, and RWG LEDs for the knob 505. In addition, the top of the module has two sets of page keys 509 and 510, one for each column of knobs cells. There are left and right selector keys for selecting channels to either or both sides and a Knobset key 511.

Each application channel function—Aux Send, Inserts, EQ, and Pan—has a knobset associated with it. Additionally, every plugin supported by the user's application can have a knobset configured by the user.

A knobset is a collection of four parameters, broken into pages. The Smart Switch can display three lines of text, from top to bottom: (1) Reserved for the channel name—changes to value when the knob is turned, (2) The function name, and (3) The parameter. Because the Smart Switch has a bitmap display, it can also be used to display EQ curves, Dynamics graphs, gain values in graphical form, and any other type of graphical information. Knobsets can be user configured using the Touchscreen (see touchscreen descriptions below).

Below are some examples of knobsets for a Digital Audio Workstation application. In this example the knobsets are taken from Steinberg's Nuendo, as briefly described above. Other knobsets can be created in a similar manner for a variety of other applications.

1. Aux Send Knobset displays all eight Nuendo aux sends.

2. Inserts Knobset (Plugins) Knobset displays the names of the plugins in the each of eight inserts for each track. Pressing the Smart Switch for that knob will then bring up the knobset for that plugin. The application will open the Plugin window simultaneously. Pressing any Smart Switch again will bring you back to the Inserts Knobset again.

3. EQ Knobset displays all of Nuendo's Track Equalizer functions.

4. Pan Knobset displays all of Nuendo's Panner functions.

5. In/Out Knobset is used to select input routing, output routing, input gain, and phase. There are several modes of operation, for example:

1. Eight knobs, single channel

2. Four knobs, dual channel.

In either mode all channel functions—Aux Sends, EQ, Pan, and Inserts (and associated plugins), are controllable from the Soft Knobs. It is also possible to assign any parameter of the application to the Soft Knobs on the MC. See the sections below "Custom Knobsets", and "Locking a Soft Knob".

Figure 6:
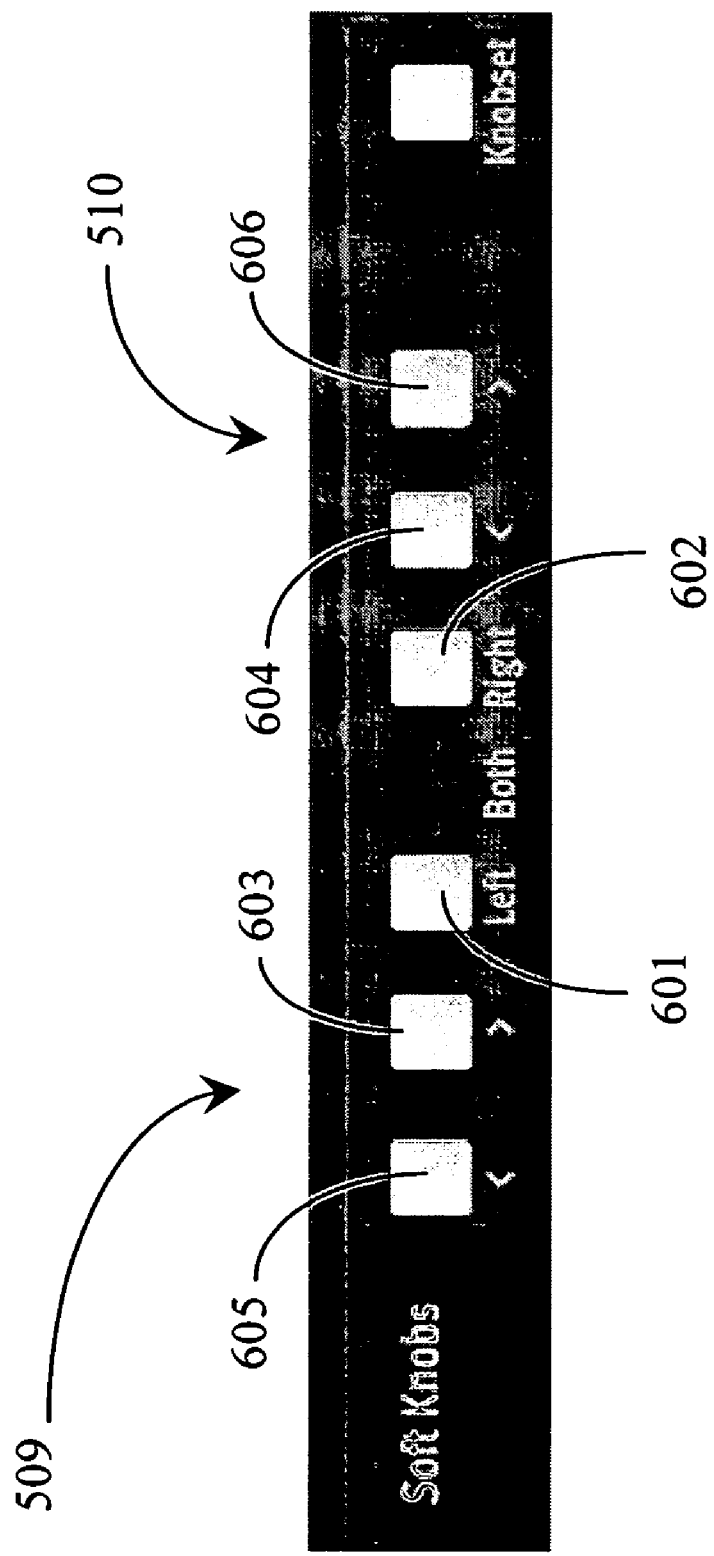
FIG. 6 is an illustration of page key sets on the control surface of FIG. 1.

The default operation mode is Eight Knobs, Single Channel When in this mode, both the Left and Right keys 601 and 602 (FIG. 6) are lit in the Page Keys sets 509 and 510. The user selects a track to the knobs by either Hitting the wave key on one of the four channel strips (see description of faders below Selecting a track using the Touchscreen (see Touchscreen descriptions), or Selecting a track in the application.

Once selected, the most recent knobset is displayed for that channel on all eight knobs. The default knobset is EQ. To select a different knobset, the user hits the Knobset key. This will display the following on the Smart Switches.

1. Inserts

2. EQ

3. Aux Sends

4. Pan

5. I/O

6.

7. -

8. Custom

Hitting one of the Smart Switches will then bring page 1 and page 2 of the knobset to the eight knobs. The knobset will stay on the Soft Knobs until the Knobset key is pressed again, even if the user selects other tracks.

For example, Nuendo will respond to changed knobsets as follows.

| When MC displays this... | The Nuendo Project Window displays this... | The Nuendo Mixer Window displays this... |
|---|---|---|
| Inserts | Inserts | Inserts |
| EQ | Equalizer Curve | Equalizers as curves |
| Aux Sends (8 knobs) | Sends | All Sends |
| Aux Sends (4 knobs), page 1 | Sends | Sends 1-4 |
| Aux Sends (4 knobs), page 2 | Sends | Sends 5-8 |
| Pan | Channel | Surround Panners |

Hitting the Custom Smart Switch will display the Custom knobset (See description of Custom Knobset below).

There are a left and a right page key (keys 603-606) for each of the two sets of page keys. 509 and 510. Hitting either of the key will scroll two pages right.

Turning off the left and right selector keys 506 allows each column of knobs to control a different channel. To select a track, the user first has to select which column, the right or left, the track will go to. This is done by hitting either the Left key or Right selector key 506. This key will stay lit until it is hit again or the opposite column key is hit. After selecting the column, the user then selects a track to the knobs by either Hitting the wave key on one of the four channel strips (see Fader description), or Selecting a track using the Touchscreen (see Touchscreen description).

Selecting a track in the application.

Once selected, the most recent knobset is displayed for that channel on all eight knobs. The default knobset is EQ. To select a different knobset, the user hits the Knobset key. This will display the following on the Smart Switches:

1. Aux Sends
2. Inserts
3. EQ
4. Pan

Hitting the page key will bring up another set of knobsets:

1. In/Out
2. -
3. -
4. Custom

When there are more than four top level knobsets, then the page keys for that column can be used to scroll through them. Hitting one of the SmartSwitches will then bring the page 1 knobset to the eight knobs. That knobset will stay on the Soft Knobs until the Knobset key is pressed again, even if the user selects other tracks.

Hitting the left page keys 603, 605 will scroll the left column, hitting the right page keys 602,604 will scroll the right column.

The user can use the Touchscreen to create a knobset that contains any of the application functions that he chooses. The user is presented with a screen that lists all of the functions for a particular application. The user then selects one of those functions, and then selects a knob in a knobset that will control that function. Selection of the knob can be done either by touching or pressing the knob itself or by touching a visual representation of the knob on the screen.

The user can select a parameter on the touchscreen and temporarily control that parameter on a Soft Knob 505. The user first presses the knob (there is a switch built into the knob itself). This causes the Lock LED 512 at the knob periphery to blink. The user then clicks on a parameter on the application screen (or otherwise modifies it). The knob will now control that parameter. The user can click on other parameters, and the knob will control them also. Pressing the knob switch again will lock the parameter onto the knob. The Lock LED 512 then lights steady. Pressing the knob switch a third time will unlock the knob and set it to the corresponding knob in the current knobset. The Lock LED goes off when this is done. It is possible to change knobsets or knobset pages while one or more knobs are locked. The locked knobs temporarily override the knob in the current knobset.

The Soft Knobs Setup key 513 pops up a window on the Touchscreen. This window is used to create, modify, save, display, and delete knobsets for Aux Sends, EQ, Pan, Inserts, I/O (defaults are provided for each application for these)

Custom knobsets

Plugins (defaults are provided for a set of popular plugins)

Figure 7:
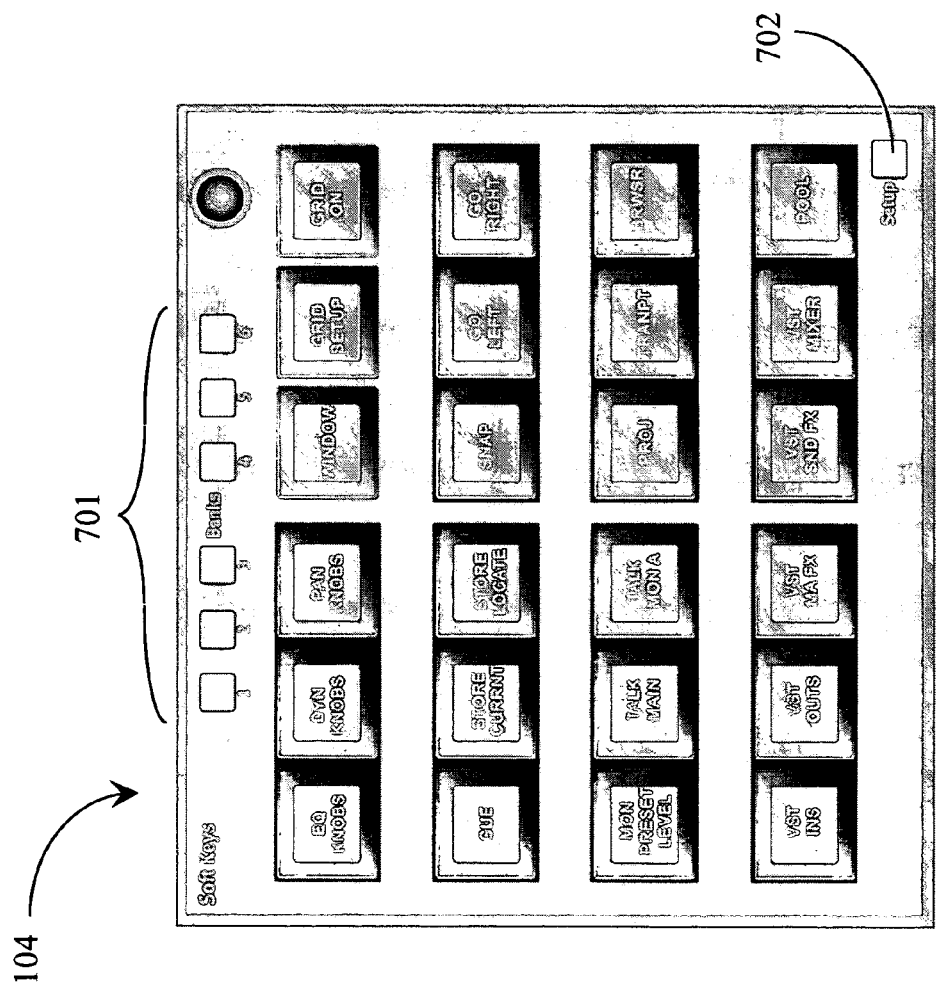
FIG. 7 is an illustration of a bank of soft keys on the control surface of FIG. 1.

FIG. 7 is a plan view of a set 104 of soft keys (smart switches) on the control surface of FIG. 1. In this example there are 24 Smart Switches, arranged in a matrix of six columns and four rows. When pressed, a Smart Switch can send out:

1. An application command
2. A keystroke sequence
3. A MIDI command
4. Various MC commands such as change wheel mode, change bank, etc.

The user can configure what each Smart Switch does using the Setup key, but typically a user will want a portion or all of the smart switches, for a particular control application, to have related functionality. Therefore related functionality for the matrix of Smart Switches can be configured and saved in separate banks for each application. Banks are numbered starting with 1 and each bank can have a mnemonic name. There can be an unlimited number of banks, limited only by data storage ability. Default banks are provided by the inventors for the most popular applications. A set of six bank keys 701 bring up banks 1 through 6 when pressed.

There are a number of useful variations in the way a user can configure Smart Switches in embodiments of the invention. For example, allowing a Smart Switch to change to another bank gives the user a number of interesting ways to organize their Smart Switches. A bank can be created that shows pull-down menus of the associated application (eg File, View, Insert, Format etc. . . . ) on the top row.

Figure 8:
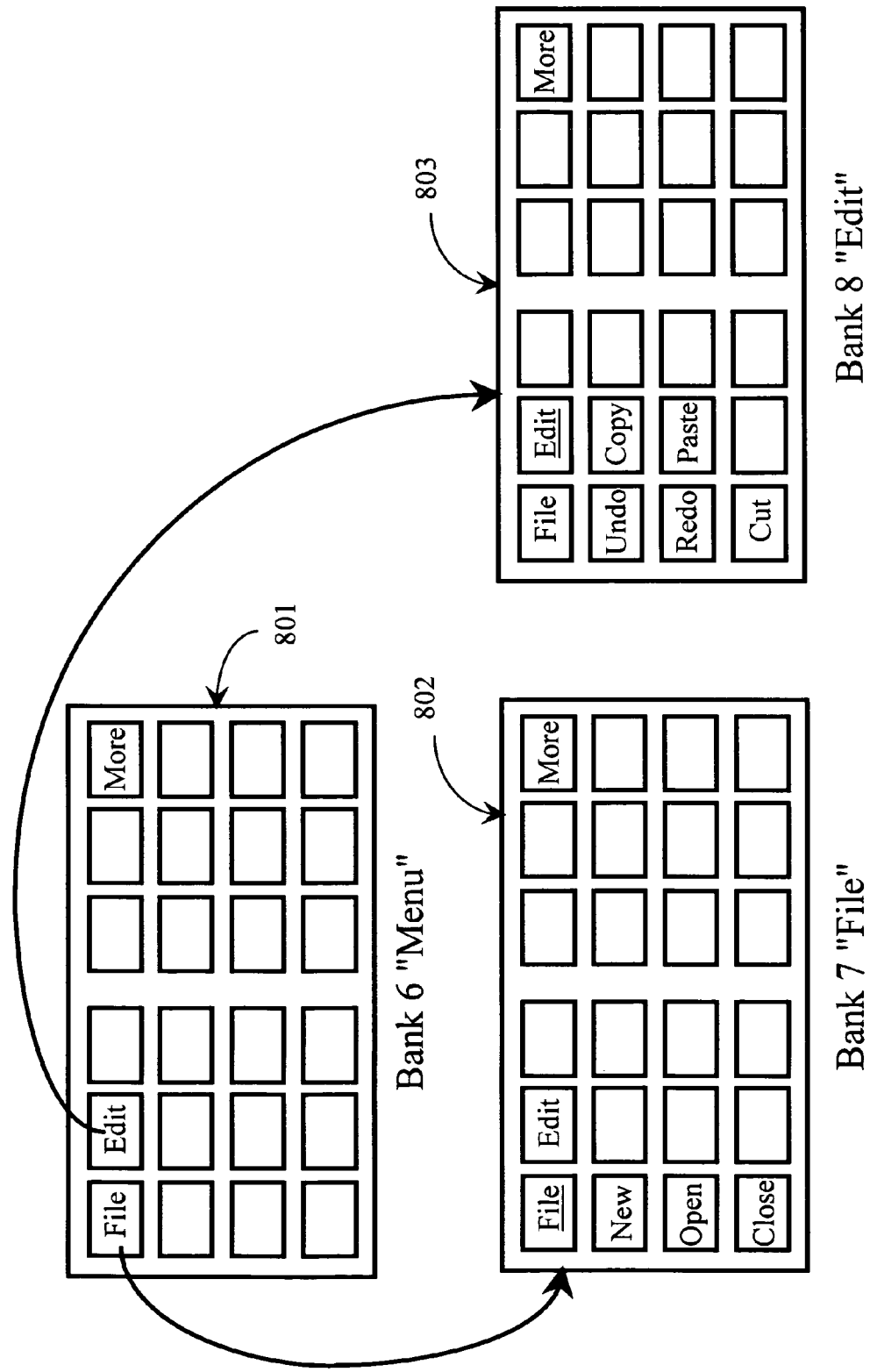
FIG. 8 is an illustration of use of pull-down menus in an embodiment of the invention.

FIG. 8 illustrates three banks 6, 7, and 8 labeled 801, 802 and 803. Imagine an application X with two pull down menus, "File" and "Edit". The "File" pull down menu contains three menu items: "New", "Open", and "Close". The "Edit" pull down menu contains five menu items: "Undo", "Redo", "Cut", "Copy", and "Paste". The user can configure the banks to display the list of pull down menus across the top row of the Smart Switches. In the case of application X, we would see "File" and "Edit" in the leftmost, and $2^{nd}$ leftmost top Smart Switches, respectively, as shown in bank 801. Pressing the "File" Smart Switch would then highlight, underline, or otherwise visually indicate that the "File" menu was selected. It would also cause the menu items to appear on the Smart Switches below the topmost row, as shown in bank 802. Of course, these are labels that appear in the one set of switches.

Now, pressing the Edit menu causes the indications in the switches as seen in bank 803. These menu items may be arranged in order of left most column first, moving downward in that column, and then spilling over into the next leftmost column, filling downward. In this way, the geometry of the pull down menu displayed on the Workstation Computer would closely match that of the menu displayed on the Smart Switches. Many other arrangements of the menu items on switches are also possible.

So, in general, pressing a top row key having a menu display selects that menu, and displays another bank which shows the drop-down menu items on the Smart Switches. For Nuendo, the most important menus are File; Edit, Project, Audio, Pool, and Transport. Menu items that are not available, that is, they are "greyed out" on the application, may be shown in a different visual state on the Smart Switches.

Soft Keys Setup Key 702 (FIG. 7) brings up Soft Key setup functions on the touch screen. Using these setup functions the user can:

1. Create, edit, reorder, name, save, copy, paste, and delete banks.
2. Choose which function goes on each Smart Switch. With Nuendo, for example, the most recently executed command is sent back to the MC, which it displays in the Soft Keys setup GUI.
3. Choose the text label or icon for the Smart Switch.

Figure 9:
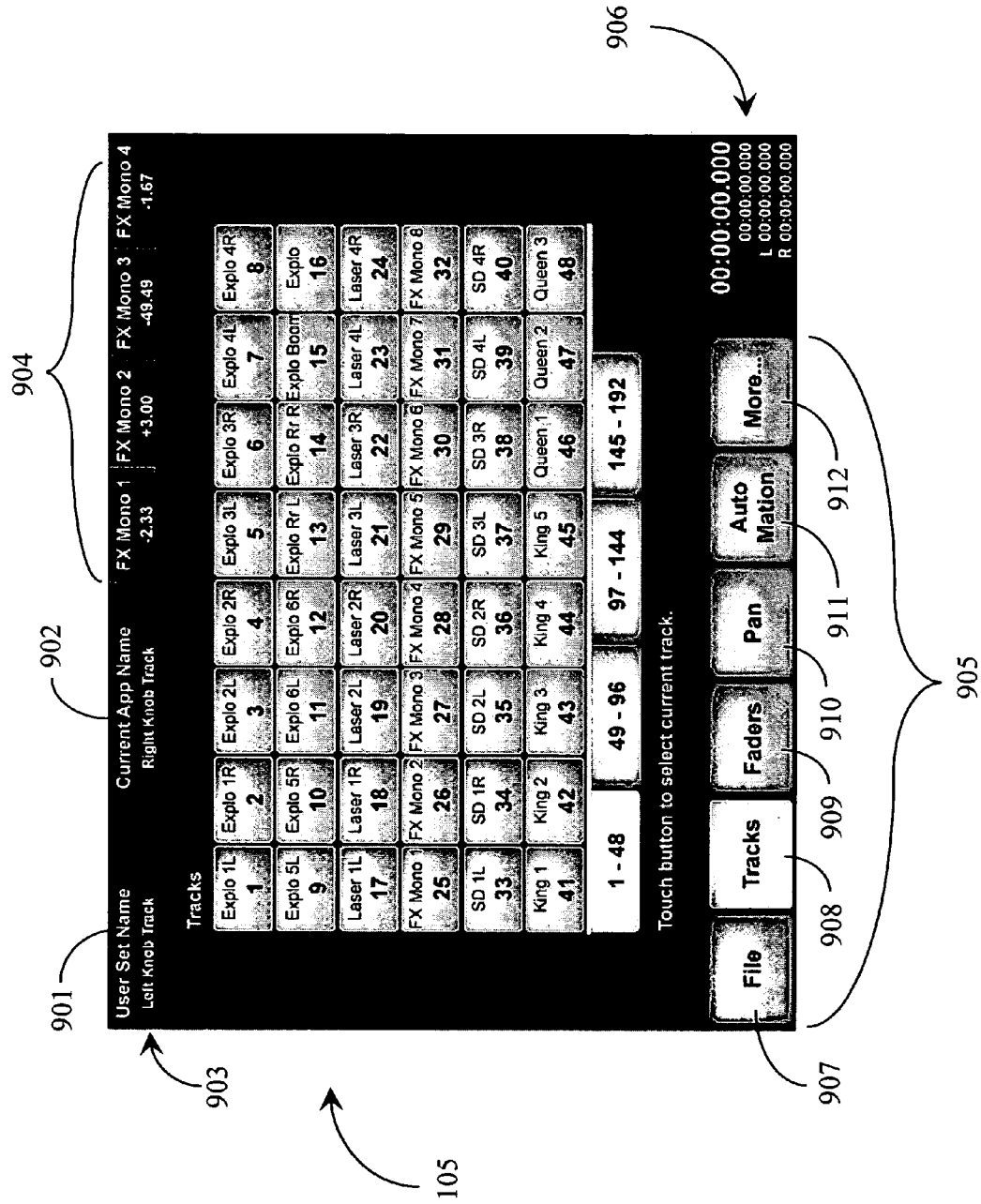
FIG. 9 shows a touch screen display in an embodiment of the present invention.

FIG. 9 shows a touch screen display in an embodiment of the present invention. Some portions of the touch screen never change, and are therefore referred to as permanent items. In this embodiment user set name 901 is displayed and current application name 902 is displayed.

There are displays (line 903) for Left Current Track and Right Current Track, which show in FIG. 9 as Left Knob Track and Right Knob Track, because the touch screen is in setup mode for soft knobs. The Left Current Track and Right Current Track displays both indicate in four knob mode, but the left only indicates in eight knob mode.

Also across the top of the touch screen there are four fader labels in this embodiment indicated by FX 1 through FX 4. The current value set for each of the four faders is shown immediately under each fader.

At the lower right corner there is a display portion 906 giving information such as Primary Time Display, Secondary Time Display, Left Locator, Right Locator and Cycle Mode. A transport status display tracks Nuendo's formats (Bars+ Beats, Seconds, Timecode, Feet+Frames 16 mm, Feet+ Frames 35 mm, Samples, User).

Across the bottom of the touch screen there are six menu display keys 905. These are used to display menus, described further below. The last menu key (912) is labeled More. This key will bring up another set of menus.

File menu 907 is used to open, store, and save User Sets. User sets are the document type for MC, and are described further below. This menu can be a touchable version of a Windows filing metaphor. Note that the keyboard will have to be redirected to the File Menu when it is open for typing in names.

Track menu 908 is used to select one or more tracks. 48 tracks at a time are displayed. The user can page to more tracks. In Nuendo, for example, track buttons are colored using Nuendo colors that the user has selected for his tracks. This will make it easier for the user to spot tracks in the 6×8 grid. In some cases track type may be shown by putting a colored band at the bottom. A momentary/latch button is used to select one or many tracks. When a track is selected, it is displayed on (1) The Soft Knobs area (2) The application, which shows it as the currently selected track or (3) A fader, if it is set to display the currently selected track Fader menu 909 is used to (1) assign one, two, three, or all four faders to display the currently selected track(s) on the application. This way, the user can select tracks on the application and they will show up instantly on one or more of the MC faders for editing. The tracks are placed onto the MC in the application's numerical order. Leftmost application track is on the leftmost MC fader (2) Page between banks of application tracks four at a time. Allow the user to quickly jump to a bank of 4 tracks. Also page between application tracks, one at a time, or (3) Assign any arbitrary application track to any MC fader. Touch a track on the touchscreen, then touch a fader or touch the fader name area of the touchscreen.

Pan menu 910 brings up a touch screen surround panner for the currently selected track. Changing the currently selected track will cause that new track's panner to be displayed. There will be a quick way to change the current track from the Pan view. The user can assign either trackball to control the panner as well as touch. Both trackballs can be assigned to control two channels at once.

Automation menu 911 can set up global automation control for the application. For Nuendo, for example, this is the global R and W keys and radio buttons for the 5 automation modes (Touch Fader, Autolatch, X-Over, Overwrite Mode, Trim).

A soft keys menu is not shown, but accessible through the "more" button. This menu displays more 24 more Soft Keys, but on the touchscreen. Any Soft Key bank (defined using the Soft Key setup button) can be displayed and accessed from the touchscreen. This gives the user even more keys, if needed.

A system menu. Also not shown but accessible through the "more" button provides for global system setup, as follows: (1) Choose Left, Right, or Both trackballs for the system mouse, (2) Select a command for footswitch down and footswitch up (same set of commands that can be assigned to a Smart Switch), and (3) Choose number of Workstation Computers we are attached to (although this can also be self-discovered by the SW)

Figure 10:
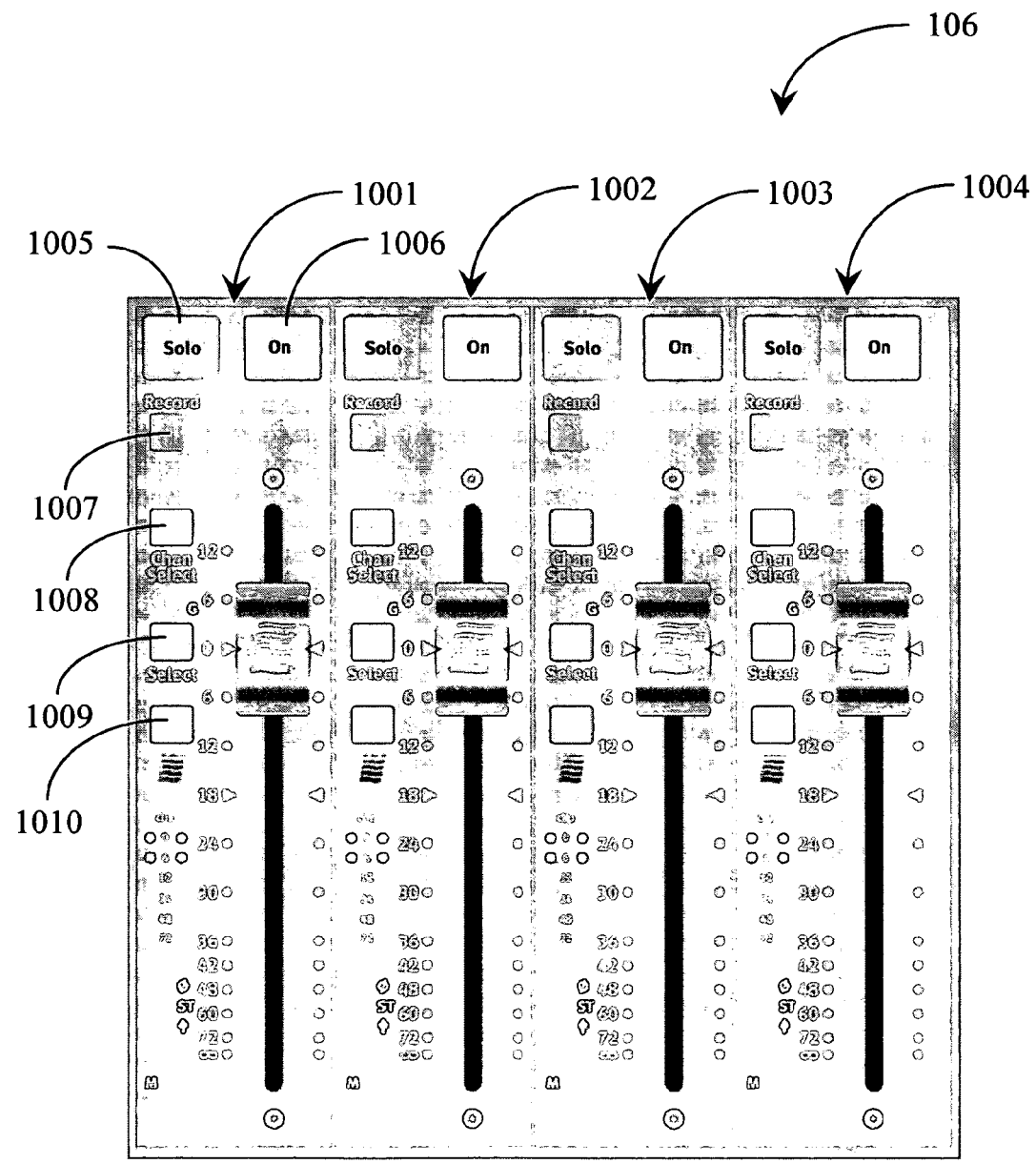
FIG. 10 illustrates a fader section from FIG. 1.

FIG. 10 illustrates fader section 106 of FIG. 1, which section provides four faders 1001, 1002, 1003 and 1004 that tracks can be assigned to. The fader names come up on the top right of the touchscreen at portion 904 of FIG. 9. Application tracks can be assigned to faders using the Assign page on the Touchscreen. Using the Assign page, it is possible to designate one of the 4 faders as always being assigned to the currently selected track in the application.

A note about Nuendo: Nuendo's faders top out at 6.02 db. Pushing an MC fader above this value will clip the value to 6.02. When the user lets go of the fader the motor will move it back down to 6.02 db. Similar clipping will occur for other applications.

Each of the four faders has a matrix of keys and indicators. Solo key 1005 for each fader solos the track. This has the same effect as hitting the solo button on a track using the application. On key 1006, when on, has the same as un-muting the track in the application. When off, it is the same as muting the track. Record key 1007 enables the track for recording. The LED is red. If the user holds down the wave key 1010 and hits Chan Select button 1008, a track can be selected to the strip, a la S5. A popup menu appears on the screen showing channels. The user selects a channel using the fader and then hits the Select key 1009 to choose the track. Holding down the Wave key 1010 and hitting the Select button selects automation modes for the channel. These modes are (1) Off (2) Read (3) Write (4) Read Write and (5) Mute. Wave key 1010 is also used to attention a track to the Soft Knobs. Also used in conjunction with the Chan Select and Select keys as described above.

Each of faders 1001-1004 has a number of LEDs. These are (1) R W (Chan Select)—unused, (2) R W G (Select)—R lights up when the track is in Read mode, W lights up when the track is in Write Mode. G is unused, (3) Meter LEDs—Left side only meters mono tracks. Left and Right side show first two channels of multiformat tracks. The meter LEDs can also show above (yellow LEDS on) and below (green LEDS on) for autotakover, (4) 48V—unused, (5) Phase—shows the phase of the track, (6) ST—lights up if the track is a stereo track, (7) Touch—lights up when the fader is touched, (8) Lock—not used, and (9) M, S, L which L lights up if a channel is a member of a linked set of channels.

Figure 11:
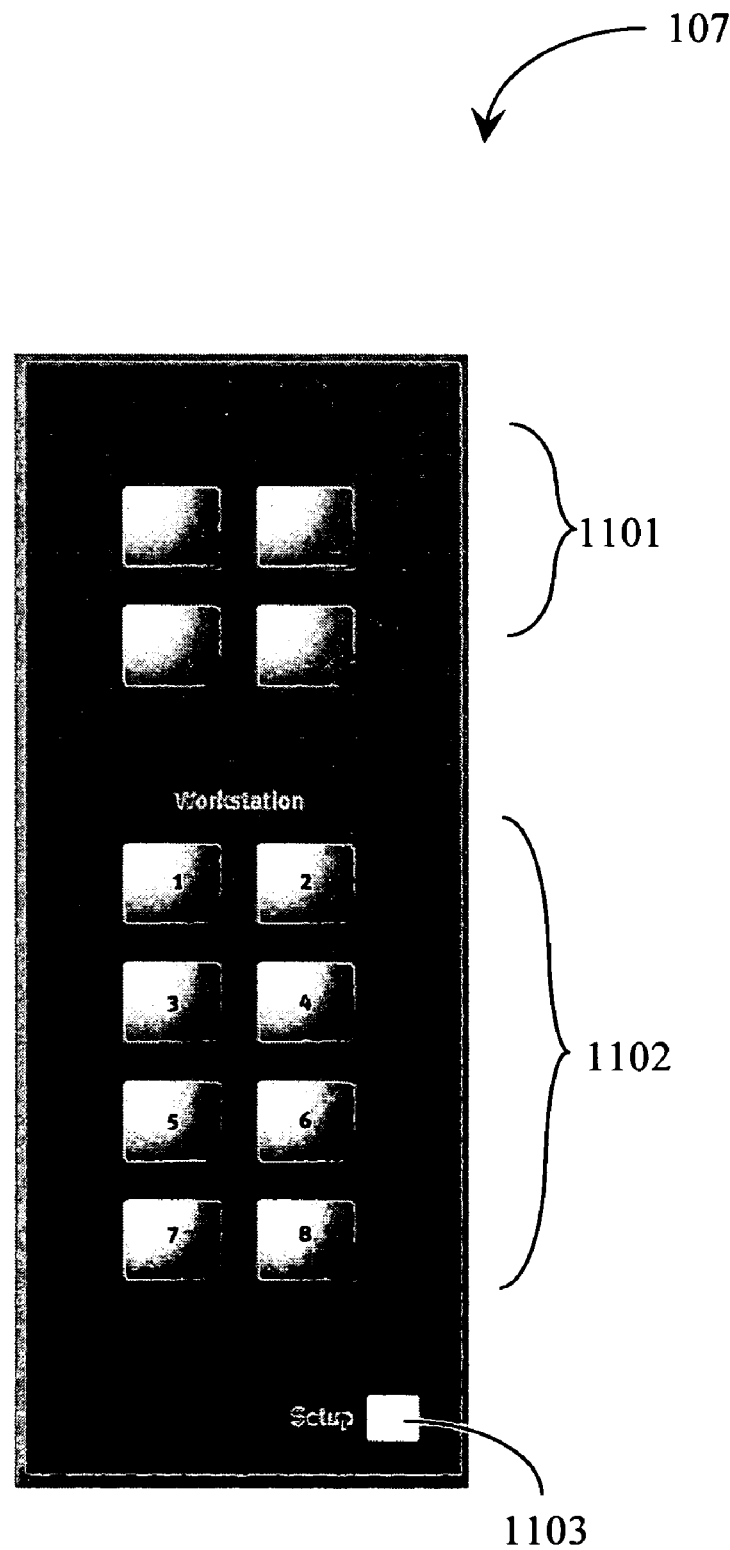
FIG. 11 illustrates a workstation selection section from FIG. 1.
Figure 12:
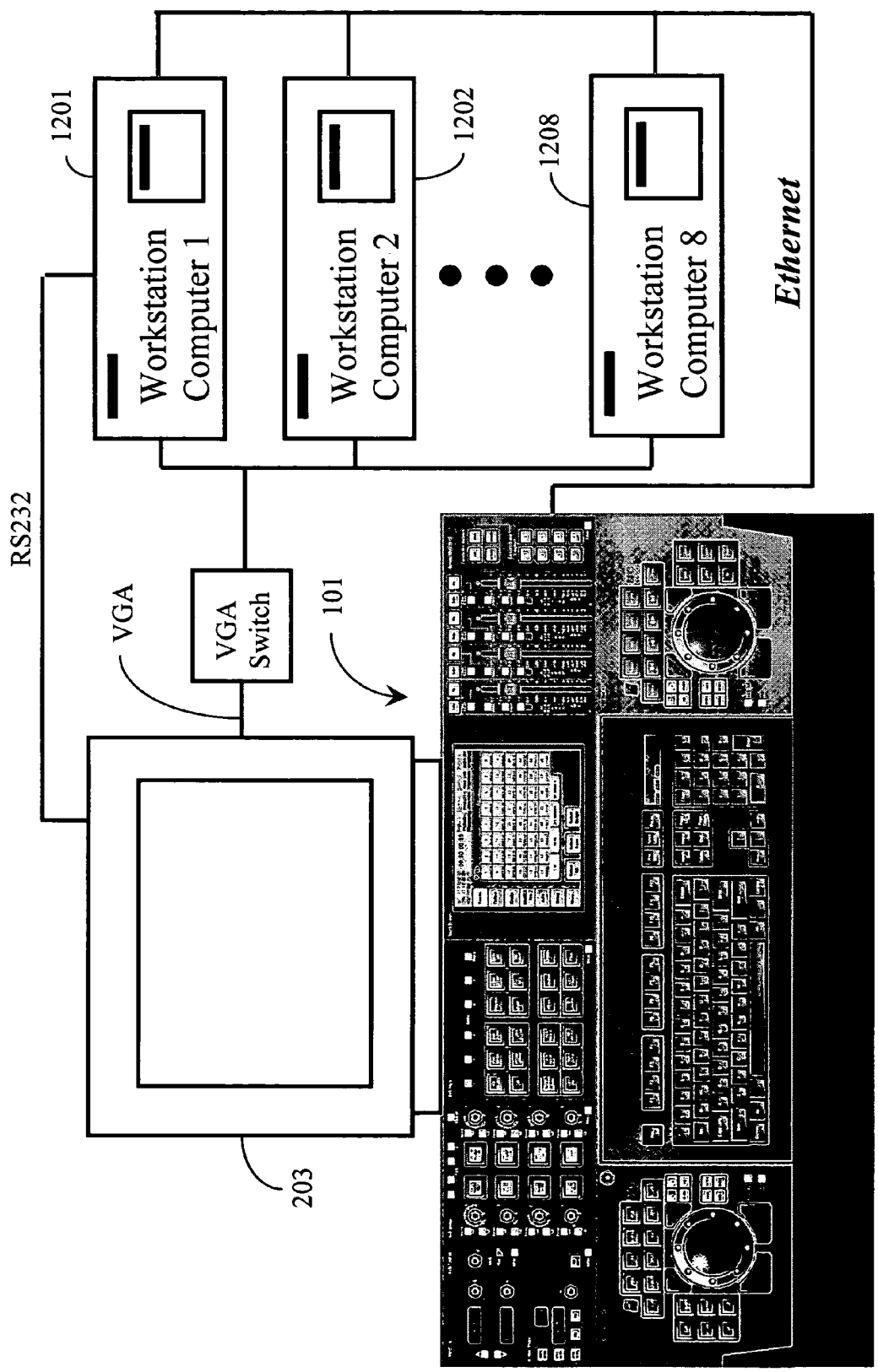
FIG. 12 shows workstation selection buttons.

Workstation Selection section 107 (FIG. 1) is shown in additional detail in FIG. 11. There are four blank buttons 1101 reserved for future use. There are eight Workstation Selection buttons 1102 to be used to control up to eight Workstation Computers as may be seen in FIG. 12. Keys 1-8 (1102) allow the user to select which of the eight Workstation Computers the control surface is controlling. When any one of these keys is pressed, workstation computer #1 can be programmed to send a command out of a serial port to switch an external video switch.

Setup key 1103 in FIG. 11 causes a popup window to be displayed on the touchscreen that (1) allows the user to select the 8 RS-232 commands to switch an external VGA switch, and (2) identifies workstation computers 1 through 8 (unless self discovery is used).

The unique control surface 101 can change functionality depending upon which application is frontmost (has the mouse and keyboard focus) on the Workstation Computer currently under control. The Smart Switches, knobs, faders, and switches can change what they are assigned to control when a different application becomes the frontmost application on the Workstation Computer. In this scheme of things the Monitor section is independent of the frontmost application at a controlled computer, as it controls external hardware not related to the computers. The Workstation Switches are also independent of application.

Figure 13:
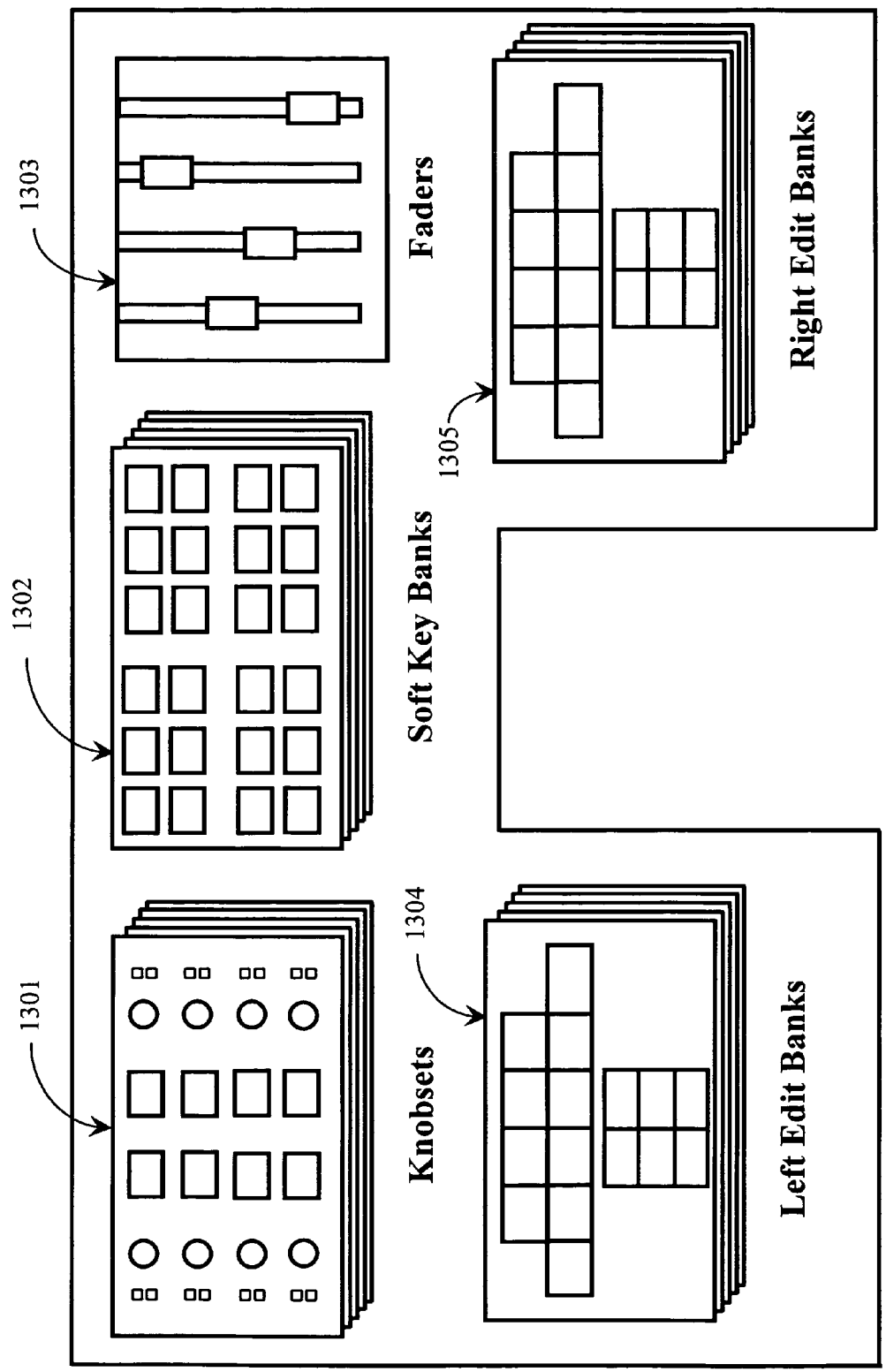
FIG. 13 illustrates the concept of an Application Set in an embodiment of the invention.

FIG. 13 illustrates the concept of an Application Set. This is the store of all the functions for a specific application, which includes all banks of 16 Edit Control Left Keys 1304, all banks of 16 Edit Control Right Keys 1305, all banks of 24 Soft Keys 1302, all Soft Knob knobsets 1301, and assignment of functions to the faders 1303. Application sets can be set to read only (write protected). The inventors provide a default Application Set for a set of popular applications. These are initially write protected. The inventors also provide a Generic Application Set that can be used to control any application. It has Cut, Copy, Paste, Undo, Redo functions in it, as well as other functions assigned by the user. It can be used as a base for creating new application sets. If an application is brought to the front that has no other application set for it, then the Generic Application Set is used.

In some embodiments of the present invention portions or sections of the unique control surface of the invention may be locked to a specific application. For example, a particular user may want the Right Edit Controller Upper Smart Switches, which may contain transport controls, to always control a specific application. This may be done in the setup window of the touch screen, which is shown in FIG. 14.

In FIG. 14 an interactive screen 1401 is shown which may be displayed on the touch screen area of the flexible control panel. In this interactive display a column 1402 provides the names of the different areas or sections of the control surface.

A second column 1403 shows the locked or not-locked condition of each area or section. For example, FIG. 14 shows Right Edit Upper locked to the Nuendo Application Set.

In an embodiment of the invention each line has a drop-down button 1404 whereby a user may access a drop-down menu 1405 as shown. The Drop-Down menu in this example shows Not Locked, Nuendo Application Set, Logic Application Set, and Giga Sampler Application Set. By selecting a menu item for a line the user may set up the locked or not-locked aspect of the Soft Knobs section, for which the drop-down menu is activated, and the selection will then be listed on the Soft Knobs line in column 1403.

If an area or section is locked to an application set, that area or section will always control that application, regardless of which application is frontmost. If "Not Locked" is selected (which is the default), then the section will always control the frontmost application, as long as there is an application set for it. If there isn't an application set for it, then a Generic Application Set may be used.

The skilled artisan will realize that the figure and description is an example, and that the control surface may be divided up into other sections in other implementations and embodiments.

Figure 15:
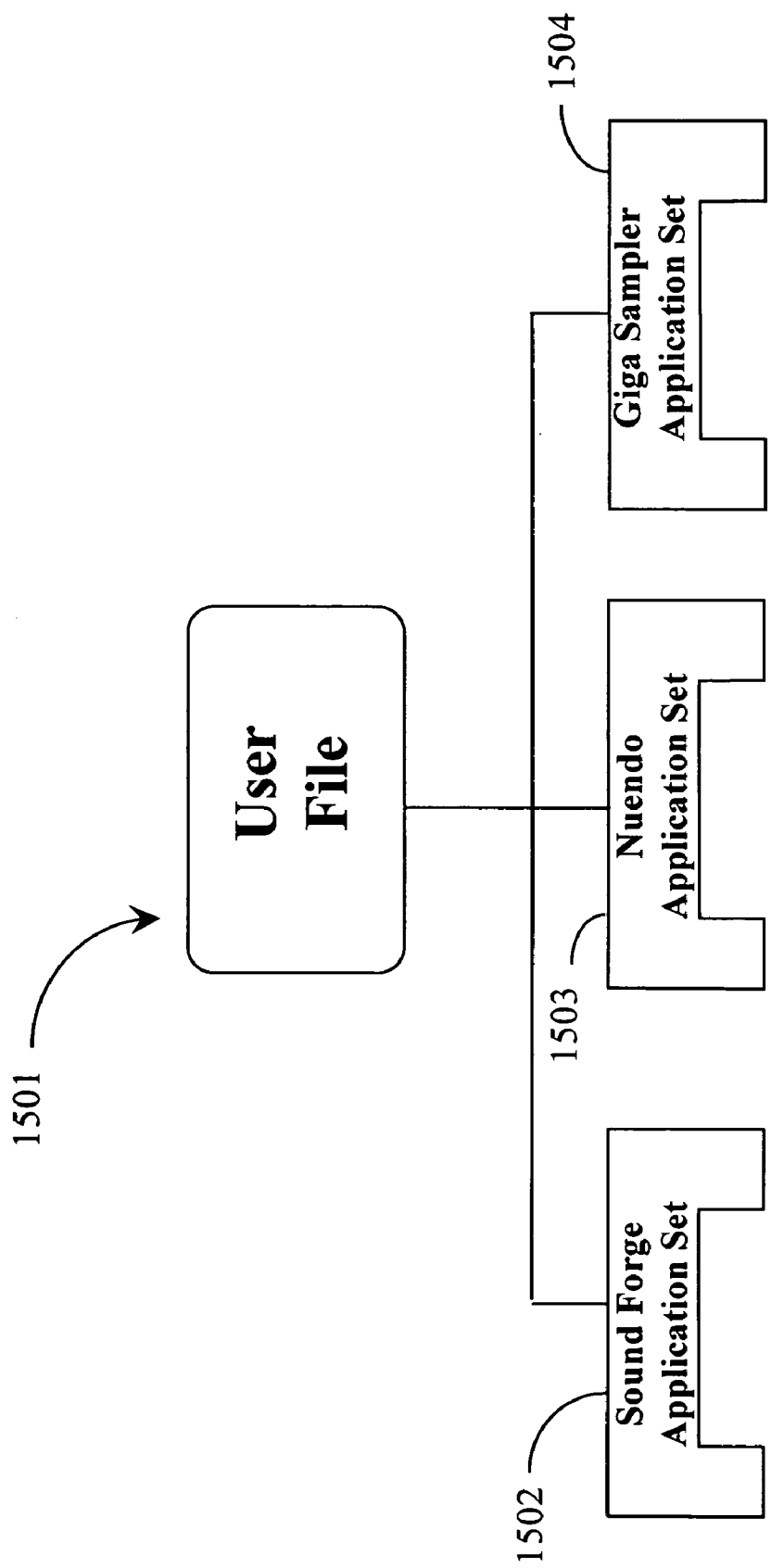
FIG. 15 illustrates a collection of application sets which make up a User File in an embodiment of the invention.

FIG. 15 illustrates a collection of application sets 1502, 1503 and 1504, which make up a User File 1501. The User File can be saved to disk, and is a document stored by the control surface system.

The following functions can be accomplished using the flexible control surface in embodiments of the invention:

(1) New, Open, Save, Save As, User Files
   (a) Storage can be to internal Flash, any USB Drive attached to the MC, or remotely on the Workstation Computer.

(2) New, Open, Save, Save As, Delete, mark as Read Only (write protect) Application Sets (3) Copying an Application Set from one User File to another.

(4) Copying banks and knobsets from one application set (and User File) to another.

In various embodiments of the invention these functions are initiated through menus in the manner of a File Menu much like the standard PC (Windows and Mac) filing metaphor, so it is as familiar to the user. The inventors in one embodiment provide a Default User Set which includes default Application Sets. These are Read Only.

Further to the above software for the control surface can be updated via Ethernet from the Workstation Computer.

Figure 16:
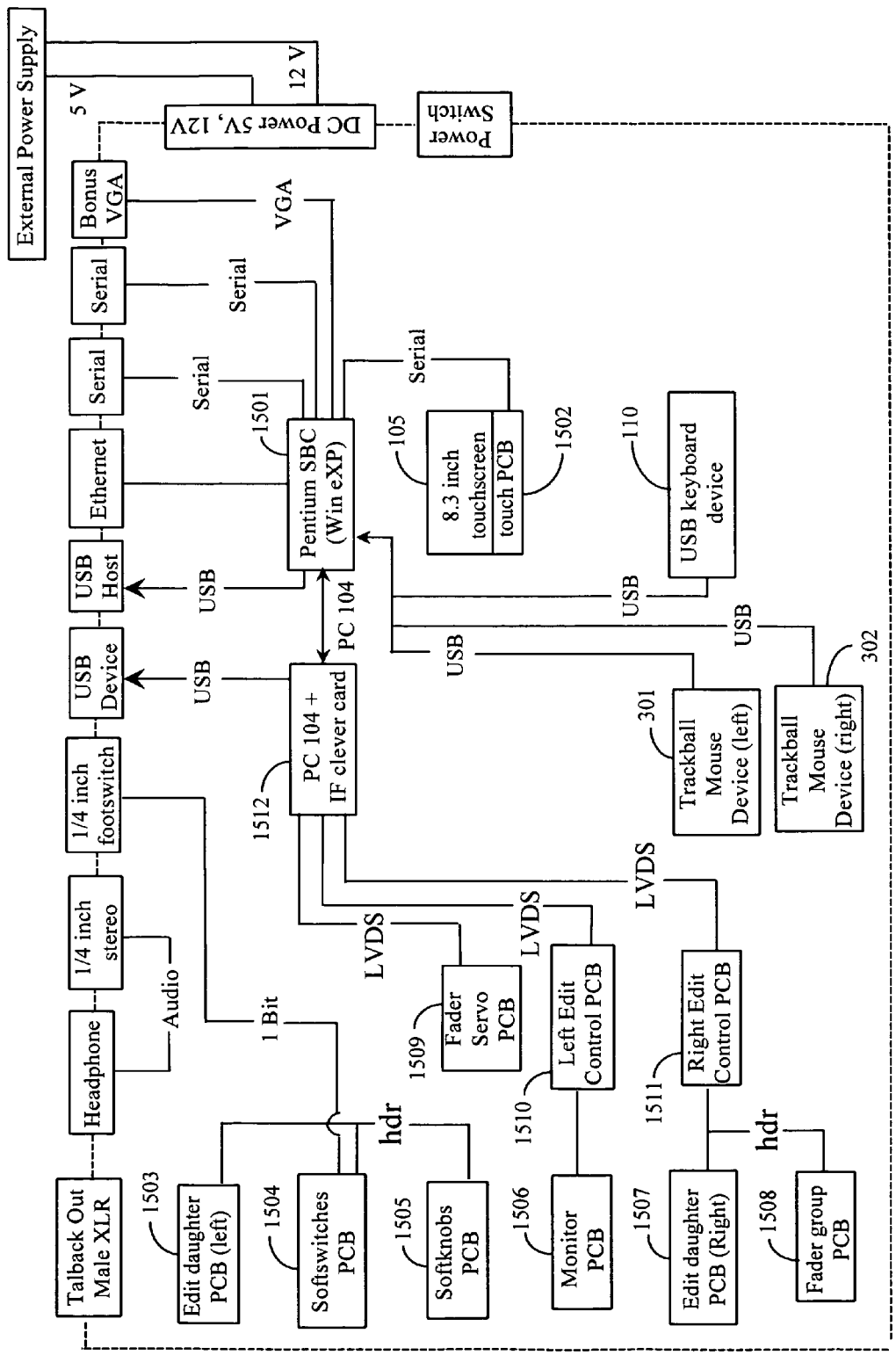
FIG. 16 is a diagram illustrating an electronic architecture for a control surface in one embodiment of the present invention.

FIG. 16 is a diagram illustrating an electronic architecture for control surface in one embodiment of the present invention. At the center of the electronic system is a Single Board Computer (SBC) 1501, the Pentium SBC. The Pentium SBC 1501 drives the Touchscreen 105, which is a video display unit. A Touch sensor Printed Circuit Board (PCB) 1502 sends positional information back to the Pentium SBC using a serial protocol. USB Keyboard Device110 (the attached keyboard), the Track Ball/Mouse Device Left 301 (the left trackball/wheel/mouse buttons), and the Track Ball Mouse Device Right 301, connect to the Pentium SBC 1501 via a Universal Serial Bus (USB). Keyboard input and commands are relayed back to the Workstation Computer over the Pentium SBC's Ethernet port.

There are a number of PCBs that implement the MC faders, knobs, and switches.

(1) Edit Daughter PCB (left) 1503—all switches but the Smart Switches for the left Edit Controller,
(2) SoftSwitches PCB 1504—Soft Keys, (3) Soft Knobs PCB 1505—the Soft Knobs area,
(4) Monitor PCB 1506—the monitor area,
(5) Edit Daughter PCB 1507 (right)—all switches but the Smart Switches for the Right Edit Controller,
(6) Fader Group PCB 1508—the Fader area,
(7) Fader Servo PCB 1509—servo control for the motorized faders,
(8) Left Edit Controller PCB 1510—the Smart Switches for the left Edit Controller,
(9) Right Edit Controller PCB 1511—the Smart Switches for the right Edit Controller.

All of the PCBs described connect electrically as shown to the PC 104+ IF Clever Card 1512, which interfaces these switches to the Pentium SBC 1501, so the Pentium SBC can both send and receive electrical signals from the cards. Software on the Pentium SBC controls the logic for the control surface and implements the touchscreen user interface. User Files can be saved on the Pentium SBC's internal Flash Memory, on a USB memory device attached to the Pentium SBC's USB host port, or on the Workstation Computer over the Pentium SBCs Ethernet port.

It will be apparent to the skilled artisan that there are many other ways to implement the MC controller. It will further be apparent to the skilled artisan that there are a variety of changes that may be made in embodiments of the flexible control surface described above without departing from the spirit and scope of the invention. There may be, for example, more or fewer sliders and switches on the system, different sorts of keyboards, a different kind of pointer device used than the trackballs shown, and many, many other changes.

Following is a listing of Control Surface to Nuendo commands in one embodiment of the present invention. These commands are accomplished using a special Application Programming Interface (API). Nuendo is a EuCon aware application. A similar set of commands and functions will exist for any other application software, device, or object that is controlled by the control surface.

Commands initiated from any of the Smart Switches ask Nuendo to perform a function, and are as follows:

1. Any of the hundreds of commands found in Nuendo's File/KeyCommands menu

2. Popup menu commands that are not in the above
   A. Snap Modes (accessible from the Project Window Toolbar)
   (1) Highest Priority: Grid, Events, Shuffle
   (2) Lower Priority: Magnetic Cursor, Grid+Cursor, Events+Cursor, Events+Grid+Cursor
   B. Grid pop-up menu (Project Window Toolbar) (Not as important)
   (1) Subframe, ¼ frame, ½ frame, 1 frame, 2 frames, 1 second
   C. Track List Context Menu—operates on selected track in Project Window
   D. Arrow key popup
   (1) Normal Sizing
   (2) Sizing Moves Events
   (3) Sizing Applies Time Stretch
   E. Automation Mode (Project Window Toolbar)
   (1) Touch Fader
   (2) Autolatch
   (3) X-Over
   (4) Overwrite Mode
   (5) Trim 3. Other commands not found in Nuendo's File/KeyCommands menu
   A. Pool Window Commands
   (1) Play Button
   (2) Search Button—Toolbar
   (3) Search button—lower search pane 4. Insert 1-8 On/Off 5. EQ Master On/Off 6. EQ Band On/Off 7. Aux Send On/Off 8. Aux Send Pre/Post 9. Fader Mute 10. Fader Solo 11. Track Automation Mode
    A. R on/off
    B. W on/off
    C. M on/off 12. Enter Zoom/Position mode (simulate a mouse click in the lower half of the ruler)

13. Exit Zoom/Position mode

Wheel, Knob and Fader Commands are continuous commands, rather then incremental commands like a pushbutton switch. These commands are:

Wheel commands as continuous commands that are initiated from the left or right Edit Controller Wheel or the Trackball. When assigned to the trackball, only the X or Y movements are sent, depending upon the function. This is user selectable.

1. Jog Wheel—Transport—this is the default for the non-mouse wheel

2. Shuttle Speed—Transport

3. Scrub—Project Window (individual track scrub)

4. Zoom—Project Window Waveform

5. Zoom—Project Window Horizontal

6. Zoom—Project Window Vertical

7. Move—Project Window Selected Clip position

8. Slip—Project Window Selected Clip audio slip

9. Trim Head—Project Window Selected Clip

10. Trim Tail—Project Window Selected Clip

11. Fade In—Project Window Selected Clip

12. Fade Out—Project Window Selected Clip

13. Volume—Project Window Selected Clip

14. Pan—$1^{st}$ selected track

The Trim Head, Tail, and Move functions also work on Ranges if the Range tool is selected.

Knob commands are continuous commands typically assigned to a Soft Knob

1. Level Control—Transport—Output Channel N (main monitor level)

2. Aux Send Level N

3. Channel Delay

4. EQ
   A. For each of 4 bands, Gain, Freq, Q

5. Pan
   A. Left/Right, Surround

6. VST Plugin Parameter

The fader command is:

1. Set Track N fader

Program commands are used to keep Nuendo in sync with what is happening on the control surface.

1. Select Track N

2. Change the Project Window Inspector to show
   A. Inserts
   B. Equalizer Curve
   C. Sends 3. Change the Mixer Window Global Extended Channel to show
   A. Inserts
   B. Equalizer curves
   C. All Sends
   D. Sends 1-4
   E. Sends 5-8

4. Open Plugin X (called when an Insert Knobset for Plugin X is displayed on the Soft Knobs)

Many of the commands that can be sent to Nuendo can also be sent from Nuendo back to the MC. There is symmetry in operation. Some other things sent from Nuendo to MC are just one way status info.

Transport status:

1. Primary Time Display

2. Secondary Time Display

3. Left Locator

4. Right Locator

5. Transport Display Format

6. Record—the Smart Switch needs to change color when going in and out of record.

7. Play

8. Stop

9. Cycle

Most of the hundreds of key commands don't have any status that comes back to the control surface. The following can be displayed on the control surface.

1. Insert On/Off

2. EQ Master On/Off

3. EQ Band On/Off

4. Aux Send On/Off

5. Aux Send Pre/Post

6. Fader Mute

7. Fader Solo

8. Track Automation Mode
   A. R on/off
   B. W on/off
   C. M on/off

No Status is required for the Wheel. It has no state.

Knob status is as follows:

1. Level Control—Transport—Output Channel N (main monitor level)

2. Aux Send Level N

3. Channel Delay

4. EQ
   A. For each of 4 bands, Gain, Freq, Q

5. Pan
   A. Front Pan, Surround

6. VST Plugin Parameter

7. Current knob parameter clicked on by the user (for Locking a parameter to a knob).

An ID for the parameter needs to be passed in.

Fader status is Track N fader level (for moving the faders)

Program status commands are used to keep the control surface system in sync with what is happening on Nuendo (in this particular embodiment). These are:

1. Select Track N

2. Change the Soft Knobs to show:
   A. Inserts
   B. Equalizer
   C. All Sends
   D. Sends 1-4
   E. Sends 5-8

3. Meter data for the four Tracks currently on the faders.

4. Phase (in/out) status for the four Tracks currently on the faders.

5. Plugin X Opened (tells MC to put the plugin on the Soft Knobs)

6. Command X was just executed (Key Commands shows the last executed command)

7. Color set by user of each track (for the track view on touchscreen).

8. Track's automation level is above or below the track's fader level (to indicate above or below on Fader LED meters when in autotakeover mode).

These are bi-directional commands:

1. Send MC a list of all Plugins available to Nuendo

2. For a given Plugin, send MC a list of all its parameters.

3. For a given channel, send MC a list of all plugins on Track N's eight Inserts The control surface to computer command is: Launch Nuendo Many of the commands assigned to a Smart Switch are processed internally by the control surface system, and don't ever get to the application controlled. These commands are used to change some operational mode of the control surface.

These commands are used to illustrate how the control surface can control Nuendo. A similar set of commands might be used for controlling other applications, devices, or objects.

1. Go to Smart Switch Bank N
2. Go to Left Edit Control Bank N
3. Go to Right Edit Control Bank N
4. Go to Fader Layout N
5. Go to the next Fader Bank
6. Go to the previous Fader Bank
7. Go to Fader Bank N
8. Change the color of a switch (for going into record, for example)
9. Assign Left or Right Edit Control Wheel or Trackball X or Trackball Y movements to
   A. Windows Mouse Wheel
   B. Shuttle Speed—Transport
   C. Jog Wheel—Transport
   D. Scrub—Project Window (individual track scrub)
   E. Zoom—Project Window Waveform
   F. Zoom—Project Window Horizontal
   G. Zoom—Project Window Vertical
   H. Move—Project Window Selected Clip position
   I. Slip—Project Window Selected Clip audio slip
   J. Trim Head—Project Window Selected Clip
   K. Trim Tail—Project Window Selected Clip
   L. Fade In—Project Window Selected Clip
   M. Fade Out—Project Window Selected Clip
   N. Volume—Project Window Selected Clip
   O. Pan—$1^{st}$ selected track
10. Talk to Mon A
11. Talk to Mon B
12. Talk to Mon C
13. Talk to Mon D
14. Talk to Control Room Keystroke and MIDI commands are used to illustrate how the control surface can control generic Applications. A similar set of commands would be used for controlling other devices or objects.

Any keystroke or sequence of keystrokes can be attached to a Smart Switch. These keystrokes are sent to the application when the Smart Switch is hit. MIDI Commands can also be attached to MC controls and sent out. The MC can also receive MIDI commands.

These are control send MIDI commands:

Smart Switch:
1. Note On/Off
2. MIDI Program Change
3. MIDI Machine Control Knob
4. MIDI Continuous Controller Fader:
1. MIDI Continuous Controller
2. Fader On Switch
3. Fader Mute Switch
4. Note On/Off
5. MIDI Program Change
6. Fader Record Switch
7. MIDI Machine Control Track Arm These are control surface MIDI Receive commands Smart Switch
A Smart Switch can change it's color state based upon receiving
1. Note On/Off
2. MIDI Program Change
3. MIDI Machine Control Time Code Display
MIDI Time Code is displayed in the primary display.

Knob
The knob position will respond to MIDI Continuous Controller messages

Fader
The fader position will respond to MIDI Continuous Controller messages

Fader On Switch

Fader Mute Switch
These switches will light up in response
A. Note On/Off
B. MIDI Program Change Fader Record Switch
Will light up in response to
A. MIDI Machine Control Track Arm.

The following is a more detailed description of in particular software aspects of the invention. The invention described here in several embodiments adds a new aspect to this scenario: the ability of a control surface to automatically detect which application is currently in focus on the workstation, and dynamically re-map the surface controls so that they issue and respond to messages appropriate for the in-focus application. In this sense the control surface becomes an extension of the standard workstation pointer device and keyboard, in that it also interacts with whatever application is currently in focus. Additionally, however, the adaptable control surface described can dynamically adjust its control and displays for optimal interaction with the application that has just come into focus. For example, if the control surface buttons have text displays above them that can programmed, the control surface can change the text that appears there, as well as the messages that are sent when the button is pushed, whenever the in-focus application changes.

Another feature of the invention is an ability to lock one or more sections of the control surface so that those sections do not dynamically re-map when the application focus changes. For example, the user may always want a control surface fader section to control volumes in a specific application running on a workstation, regardless of which application is currently in focus on the workstation. In this scenario, only a subset of the control surface changes operation when the workstation application focus changes. A combination of static locked controls and dynamic auto re-mapping controls can thus be achieved.

In the case of multiple workstations connected to the same control surface, the invention also includes the concept of an assigned workstation, meaning the workstation currently being monitored for application focus changes. Each section of the control surface can be assigned to a workstation by a user, so that the section will either follow application focus changes on that workstation, or stay locked to a specific application on the workstation. Some surfaces implementing the invention may choose not to support workstation assignment per section, but instead make the workstation assignment a global setting.

Figure 17:
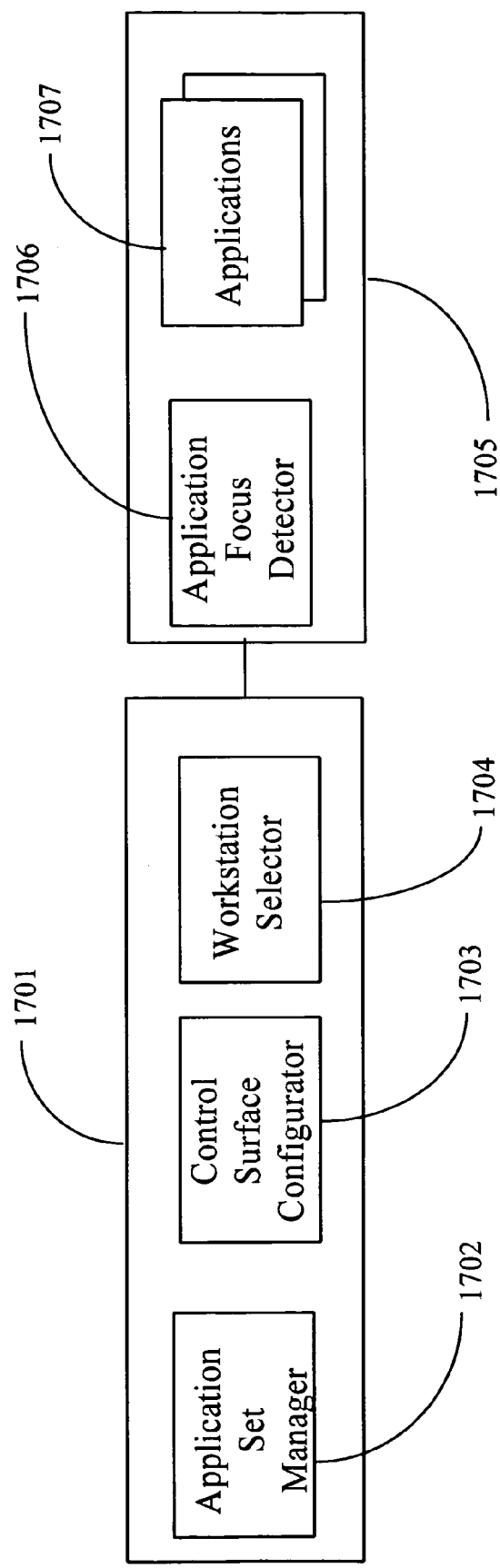
FIG. 17 illustrates a software architecture diagram in an embodiment of the invention.

FIG. 17 illustrates software features of the invention in one embodiment. Group 1701 in this architecture represents the control surface domain, and group 1705 represents the workstation domain.

Application focus detector 1706 is in this example a software component running on the workstation computers that monitors the applications currently running, and notifies the control surface when an application focus change occurs. The techniques for detecting an application focus change are specific to each workstation operating system, and are not detailed here.

Workstation selector 1704 is a software component running on the control surface that allows each control surface section (or the entire control surface) to be assigned to a specific workstation.

Control surface configurator 1703 is a software component running on the control surface that receives messages sent from the Application Focus Detector, and re-maps the control surface so that it is optimized to interact with the workstation application. The Configurator may also provide a mechanism for the user to lock controls or groups of controls to a specific workstation application, so that the controls do not re-map when the focus changes.

Application set manager 1702 is a software component running on the control surface that allows the user to define control and display mappings for workstation applications. The Application Set manager may also store these configurations on persistent storage (such as a disk drive or in flash memory). The Application Set Manager interacts with the Control Surface Configurator when an application focus change occurs, as described below.

Using the Application Set Manager, the user may set up mappings between physical surface controls and application parameters. These sets of mappings are referred to here as "Application Sets". Alternatively, the control surface, application, or third-party vendor can supply pre-configured application sets. Included in an application set is an application identifier that uniquely defines the application. For example, the application identifier could simply consist of the application's name and version.

When the user is ready to work, he or she uses the Workstation Selector component to assign sections of the surface, or the entire surface, to specific workstations. After an assignment is made, the control surface contacts the Application Focus Detector on each assigned workstation, and retrieves the unique application ID of the in-focus application. The Control Surface Configurator receives this ID, and contacts the Application Set Manager to retrieve the Application Set associated with this application. If found, the Application Set is loaded from local storage on the control surface and applied to the controls within the section. This process is repeated for each section of the surface. Note that the Application Set Manager may support storing and retrieving application sets from other locations, such as local flash memory, shared file areas on the networked workstations, or even the internet.

If the user then wants to lock a section to a workstation/application combination, he then uses a mechanism provided by the Control Surface Configurator to lock the current control mappings and focus settings to the section. At this point, the section will be immune from the re-mapping operations described below.

At this point, the control surface is ready to support user interaction with workstation applications. When the Application Focus Detector on one of the workstations detects a focus change, it sends the unique ID of the newly-in-focus application to the Control Surface Configurator. The Control Surface Configurator determines which, if any, sections are assigned to the workstation that sent the focus change message. If one or more sections are found meeting this criteria, the Configurator then checks to see if the section(s) are locked. If one or more sections assigned to the workstation are not locked, then the Configurator instructs the Application Set Manager to retrieve the Application Set associated with the unique application ID. The Configurator then uses the Application Set to re-map the section controls as defined in the Application Set.

Following is a specific example in one embodiment: Two application sets are resident on the control surface. An Application Set exists for application XYZ with unique identifier XYZ_Version_1, and specifies that the 4 knobs in section 3 of the control surface should send out MIDI controller messages 7, 11, 20, and 21, respectively. An Application Set for application ABC with unique identifier ABC_Version_3 also exists, and specifies that the same 4 knobs should send out custom protocol messages M1, N2, M3, and M4. In this example, assume that these messages have been defined by the creators of application ABC, who have also supplied the Application Set.

By using a touchscreen user interface on the control surface, the user assigns the entire control surface to Workstation A. The control surface then contacts the Application Focus Detector on Workstation A, and requests it to send the information about the currently in-focus application. The Detector responds with a message containing the application ID "XYZ_Version_1". Since the section containing the 4 knobs is not locked, the Control Surface Configurator retrieves the Application Set identified by the unique application id "XYZ_Version_1", and re-maps the knobs so that they will now send out MIDI messages 7, 11, 20, and 21 respectively when they are turned.

The user then brings a different application, ABC, into focus on Workstation A, by clicking on one of its windows. The Application Focus Detector detects this, and sends a message with the new application's unique ID to the control surface. The message is passed to the Control Surface Configurator, which—in turn—checks the lock state of the knob section, verifies it is not locked, retrieves the Application Set for ABC from the Application Set manager, and re-maps the knobs so that they now will send out custom protocol messages M1, M2, M3, and M4 when the knobs are turned.

At least partly because of the many forms that the invention may take in different aspects and embodiments, and because of the wide variety of ways the unique functionality may be accomplished in various embodiments, the invention should be afforded the scope of the claims that follow.

What is claimed is:

1. A control surface comprising:
    one or more input or output elements comprising one or more of knobs, switches, faders, or displays implemented either as hardware or as virtual elements in a touch-screen, for which functionality may be assigned;
    a central processing unit (CPU), including operating code, for managing at least functionality of the elements on the control surface; and
    a network connection for connecting to one or more computerized appliances;
    wherein the control code assigns individual ones of the one or more input or output elements to specific functions of an individual one of the one or more computerized appliances or software executed by the one or more computerized appliances.

2. The control surface of claim 1 wherein the specific functions of the individual one of the one or more computerized appliances relate to or are determined by a software program being executed by the individual computerized appliance.

3. The control surface of claim 2 wherein the individual computerized appliance executes a different software program at different times, and the control surface control code monitors the software program in execution and having keyboard and pointer focus, that is, frontmost, and automatically assigns at least a portion of the control surface functionality according to the frontmost program.

4. The control surface of claim 3 wherein functionality of at least a portion of the control surface may be locked to a specific workstation or application.

5. The control surface of claim 1 wherein the computerized appliances include personal computers (PCs).

6. The control surface of claim 1 wherein the network connection is an Ethernet connection.

7. The control surface of claim 1 wherein the network connection is a wireless connection.

8. The control surface of claim 1 further comprising an interactive display, wherein the control surface operating code includes code for generating an interactive interface on the display, enabling a user to define functionality for individual ones of the input or output elements.

9. The control surface of claim 8 wherein the operating code includes functionality for storing sets of functionality for sets of input or output elements on the control surface.

10. The control surface of claim 9 wherein individual sets of functionality include functionality for all of the input or output elements on the control surface.

11. A method for controlling one or more computerized appliances or software functions executed by the computerized appliances, comprising steps for:
 (a) implementing a control surface having one or more input or output elements comprising one or more of knobs, switches, faders, or displays implemented either as hardware or as virtual elements in a touch-screen, for which functionality may be assigned;
 (b) programming a central processing unit (CPU) for managing at least functionality of the input or output elements on the control surface;
 (c) connecting the control surface via a network connection to one or more computerized appliances; and
 (d) executing the control code to assign individual ones of the one or more input or output elements to specific functions of an individual one of the one or more computerized appliances or software executed by the one or more computerized appliances.

12. The method of claim 11 wherein the specific functions of the individual one of the one or more computerized appliances relate to or are determined by a software program being executed by the individual computerized appliance.

13. The method of claim 12 wherein the individual computerized appliance executes a different software program at different times, and the control surface control code monitors the software program in execution and having keyboard and pointer focus, that is, frontmost, and automatically assigns the control surface functionality according to the frontmost program.

14. The method of claim 13 wherein functionality of at least a portion of the control surface may be locked to a specific workstation or application.

15. The method of claim 11 wherein the computerized appliances include personal computers (PCs).

16. The method of claim 11 wherein the network connection is an Ethernet connection.

17. The method of claim 11 wherein the network connection is a wireless connection.

18. The method of claim 11 wherein the control surface further comprises an interactive display, and the control surface operating code includes code for generating an interactive interface on the display, enabling a user to define functionality for individual ones of the input or output elements.

19. The method of claim 18 wherein the operating code includes functionality for storing sets of functionality for sets of input or output elements on the control surface.

20. The method of claim 19 wherein individual sets of functionality include functionality for all of the input or output elements on the control surface.

* * * * *